United States Patent
Akanishi

(10) Patent No.: US 10,550,925 B2
(45) Date of Patent: Feb. 4, 2020

(54) BICYCLE SPROCKET

(71) Applicant: Shimano Inc., Sakai, Osaka (JP)

(72) Inventor: Kenichi Akanishi, Osaka (JP)

(73) Assignee: Shimano Inc., Osaka (JP)

(*) Notice: Subject to any disclaimer, the term of this patent is extended or adjusted under 35 U.S.C. 154(b) by 173 days.

(21) Appl. No.: 15/684,634

(22) Filed: Aug. 23, 2017

(65) Prior Publication Data

US 2018/0347680 A1    Dec. 6, 2018

Related U.S. Application Data

(63) Continuation-in-part of application No. 15/612,629, filed on Jun. 2, 2017, now abandoned.

(51) Int. Cl.
| | |
|---|---|
| *F16H 55/30* | (2006.01) |
| *B62M 9/00* | (2006.01) |
| *B62M 1/36* | (2013.01) |

(52) U.S. Cl.
CPC ............ *F16H 55/30* (2013.01); *B62M 9/00* (2013.01); *B62M 1/36* (2013.01)

(58) Field of Classification Search
CPC .......... B62M 9/105; B62M 9/00; B62M 9/10; F16H 55/30; Y10T 74/2165
USPC ........................................ 474/152, 156, 160
See application file for complete search history.

(56) References Cited

U.S. PATENT DOCUMENTS

| | | | | |
|---|---|---|---|---|
| 4,576,587 A * | 3/1986 | Nagano | ................... | B62M 9/08 474/141 |
| 7,462,120 B1 * | 12/2008 | Thompson | ............. | B62M 9/105 474/152 |
| 10,260,568 B2 * | 4/2019 | Chen | ........................ | B62M 1/36 |
| 2002/0086753 A1 * | 7/2002 | Yahata | ................... | B62M 9/105 474/160 |
| 2003/0073531 A1 * | 4/2003 | Tseng | .................... | B62M 9/105 474/160 |

(Continued)

FOREIGN PATENT DOCUMENTS

CN    105857505 A    8/2016

OTHER PUBLICATIONS

Photograph of SRAM's Eagle Direct Mount Chainring, available Aug. 2016.

(Continued)

*Primary Examiner* — Henry Y Liu
(74) *Attorney, Agent, or Firm* — Global IP Counselors, LLP

(57) ABSTRACT

A bicycle sprocket is basically provided with a sprocket body and a plurality of chain-driving teeth. The sprocket body includes a central portion, an annular portion and an intermediate portion. The central portion has a first end surface disposed around a central opening on a side surface of the intermediate portion. The annular portion is disposed radially outward from the central portion. The intermediate portion extends between the central portion and the annular portion in a radial direction. The chain-driving teeth extend radially outward from the annular portion of the sprocket body to engage with a bicycle chain. The sprocket body includes a rib protruding from the side surface of the intermediate portion. The rib has a second end surface being axially outermost in the intermediate portion. The second end surface is farther away from the center plane than the first end surface in the axial direction.

33 Claims, 17 Drawing Sheets

(56) References Cited

U.S. PATENT DOCUMENTS

| | | | | |
|---|---|---|---|---|
| 2003/0199351 | A1* | 10/2003 | Nichols | B62M 9/10 474/160 |
| 2004/0162172 | A1* | 8/2004 | Yamanaka | B62M 3/003 474/160 |
| 2005/0014590 | A1* | 1/2005 | Wen | B62M 9/00 474/152 |
| 2005/0233850 | A1* | 10/2005 | Andel | F16H 55/06 474/152 |
| 2006/0205549 | A1* | 9/2006 | Nonoshita | B62M 9/105 474/160 |
| 2007/0129193 | A1* | 6/2007 | Nonoshita | B62M 9/10 474/160 |
| 2007/0265122 | A1* | 11/2007 | Emura | B62M 9/105 474/152 |
| 2008/0161146 | A1* | 7/2008 | Shiraishi | B62M 9/12 474/160 |
| 2008/0176691 | A1* | 7/2008 | Saifuddin | B62M 9/105 474/160 |
| 2010/0317479 | A1* | 12/2010 | Delale | B62M 3/003 475/213 |
| 2013/0291678 | A1* | 11/2013 | Valle | B62M 3/00 74/594.2 |
| 2015/0080160 | A1* | 3/2015 | Staples | B62M 9/10 474/160 |
| 2015/0217834 | A1* | 8/2015 | Iwai | B62M 9/105 474/152 |
| 2015/0239528 | A1* | 8/2015 | Barefoot | F16H 55/30 474/152 |
| 2016/0052599 | A1* | 2/2016 | Reiter | B62M 9/105 474/148 |
| 2016/0298752 | A1* | 10/2016 | Winans | F16H 55/303 |
| 2017/0167590 | A1* | 6/2017 | Braedt | B62M 1/36 |
| 2017/0292598 | A1* | 10/2017 | Moore | B22D 21/007 |
| 2017/0343047 | A1* | 11/2017 | Chen | B62M 1/36 |

OTHER PUBLICATIONS

Photograph of Rotor's Hawk Direct Mount Chainring—Q-RING, available Sep. 2016.

Photograph of SRAM's CX1-X-sync-Direct Mount Chainring, available Dec. 2016.

Photograph of SRAM's XX1-X-sync-Direct Mount Chainring, available Apr. 2016.

* cited by examiner

BICYCLE SPROCKET

BACKGROUND

Field of the Invention

This invention generally relates to a bicycle sprocket. More specifically, the present invention relates to a bicycle sprocket having increased rigidity.

Background Information

Most bicycles have a drivetrain that uses a bicycle chain to transmit a pedaling action from a rider to a rear wheel.

A bicycle drivetrain typically includes at least one front sprocket provided on a bicycle crank assembly of the bicycle, at least one rear sprocket provided on a rear hub of the bicycle and a drive chain that connects the front sprocket to the rear sprocket. The bicycle chain wraps around the front and rear sprockets. The front sprocket is typically part of the bicycle crank assembly that further includes a pair of crank arms and a crank axle. The crank axle is rotatably supported to a bicycle frame by a bottom bracket. The crank arms are mounted to opposite ends of the crank axle. The crank arms have pedals rotatably mounted at their free ends. The crankset converts the pedaling motion of the rider's into rotational motion. This rotational motion of the crankset drives the drive chain, which in turn drives the rear sprocket to rotate the rear wheel. Thus, rotation of the bicycle crank assembly by the rider is transmitted to the rear wheel by the bicycle chain.

SUMMARY

Generally, the present disclosure is directed to various features of a bicycle sprocket. In one feature, a bicycle sprocket is reinforced to provide rigidity to the bicycle sprocket for effectively transmit a pedaling force to a bicycle chain via the bicycle sprocket.

In view of the state of the known technology and in accordance with a first aspect of the present disclosure, a bicycle sprocket is provided that basically comprises a sprocket body and a plurality of chain-driving teeth. The sprocket body has a rotational center axis, a center plane perpendicular to the rotational center axis, a first side surface and a second side surface opposite to the first side surface with respect to an axial direction parallel to the rotational center axis. The sprocket body includes a central portion, an annular portion and an intermediate portion. The central portion has a central opening through which the rotational center axis passes, and a first end surface disposed around the central opening on at least one of the first and second side surfaces. The first end surface is an axial end surface of the central portion. The annular portion is disposed radially outward from the central portion with respect to the rotational center axis. The intermediate portion extends between the central portion and the annular portion in a radial direction about the rotational center axis. The chain-driving teeth extend radially outward from the annular portion of the sprocket body to engage with a bicycle chain. The sprocket body fluffier includes a rib protruding from the at least one of the first and second side surfaces of the intermediate portion. The rib has a second end surface that is an axial end surface of the intermediate portion. The second end surface is farther away from the center plane than the first end surface in the axial direction.

According to the first aspect of the present invention, it is possible to reinforce the rigidity of a bicycle sprocket to effectively transmit a pedaling force to a bicycle chain via the bicycle sprocket.

In accordance with a second aspect of the present invention, a bicycle sprocket is provided that basically comprises a sprocket body and a plurality of chain-driving teeth. The sprocket body has a rotational center axis, a first side surface and a second side surface opposite to the first side surface with respect to an axial direction parallel to the rotational center axis. The sprocket body includes a central portion, an annular portion and an intermediate portion. The central portion has a central opening through which the rotational center axis passes. The annular portion is disposed radially outward from the central portion with respect to the rotational center axis. The intermediate portion extends between the central portion and the annular portion in a radial direction about the rotational center axis. The intermediate portion includes a first arm and a second arm. The central portion is at least partially disposed between the first and second arms. The chain-driving teeth extend radially outward from the annular portion of the sprocket body to engage with a bicycle chain. The sprocket body further includes a rib protruding from at least one of the first and second side surfaces of the intermediate portion. The rib at least partially extends from the first arm to the second arm such that an angle between the rib and a reference plane including the rotational center axis is in a range between sixty-five degrees to ninety degrees as viewed in the axial direction. The reference plane extends parallel to a longitudinal direction of a crank arm in a mounted state where the bicycle sprocket is mounted to the crank arm.

According to the second aspect of the present invention, it is possible reinforce rigidity of a bicycle sprocket to effectively transmit a pedaling force to a bicycle chain via the bicycle sprocket.

In accordance with a third aspect of the present invention, the bicycle sprocket according to the first aspect is configured so that the intermediate portion includes a first arm and a second arm, the central portion being at least partially disposed between the first and second arms.

According to the third aspect of the present invention, it is possible to reinforce the rigidity of a bicycle sprocket to effectively transmit a pedaling force to a bicycle chain via the bicycle sprocket.

In accordance with a fourth aspect of the present invention, the bicycle sprocket according to the third aspect is configured so that the rib includes a first rib extending from the first arm to the second arm in a direction perpendicular to the rotational center axis, and the second end surface includes a first rib end surface provided on the first rib.

According to the fourth aspect of the present invention, it is possible to further reinforce the rigidity of a bicycle sprocket to effectively transmit a pedaling force to a bicycle chain via the bicycle sprocket.

In accordance with a fifth aspect of the present invention, the bicycle sprocket according to the fourth aspect is configured so that the first rib has a first end portion disposed on the first arm, a second end portion disposed on the second arm and a middle portion disposed between the first and second end portions.

According to the fifth aspect of the present invention, it is possible to further reinforce the rigidity of a bicycle sprocket to effectively transmit a pedaling force to a bicycle chain via the bicycle sprocket.

In accordance with a sixth aspect of the present invention, the bicycle sprocket according to the fifth aspect is configured so that the middle portion has an axial height that is larger than axial heights of the first and second end portions.

According to the sixth aspect of the present invention, it is possible to effectively reinforce the rigidity of a bicycle sprocket.

In accordance with a seventh aspect of the present invention, the bicycle sprocket according to the fifth or sixth aspect is configured so that the middle portion is disposed on the at least one of the first and second side surfaces of the central portion.

According to the seventh aspect of the present invention, it is possible to reinforce around a center of a bicycle sprocket.

In accordance with an eighth aspect of the present invention, the bicycle sprocket according to any one of the fifth to seventh aspects is configured so that the first and second end portions are disposed on opposite sides with respect to a first reference plane including the rotational center axis.

According to the eighth aspect of the present invention, it is possible effectively reinforce the rigidity of a bicycle sprocket.

In accordance with a ninth aspect of the present invention, the bicycle sprocket according to the eighth aspect is configured so that the first and second end portions extend from the middle portion toward a second reference plane that is perpendicular to the first reference plane and includes the rotational center axis.

According to the ninth aspect of the present invention, it is possible to effectively use a space to arrange a first rib on a bicycle sprocket.

In accordance with a tenth aspect of the present invention, the bicycle sprocket according to any one of the fifth to ninth aspects is configured so that at least part of the first rib extends linearly between the first and second arms.

According to the tenth aspect of the present invention, it is possible to reinforce a portion of a bicycle sprocket between a first and second arms.

In accordance with an eleventh aspect of the present invention, the bicycle sprocket according to any one of the second to tenth aspects is configured so that the first and second arms at least partially define a first intermediate opening therebetween.

According to the eleventh aspect of the present invention, it is possible to reinforce a portion of a bicycle sprocket between a first and second arms.

In accordance with a twelfth aspect of the present invention, the bicycle sprocket according to the eleventh aspect is configured so that the rib includes a first rib extending along a part of an outer periphery of the first intermediate opening.

According to the twelfth aspect of the present invention, it is possible to effectively use a space between a central opening and a first intermediate opening to arrange a first rib on a bicycle sprocket.

In accordance with a thirteenth aspect of the present invention, the bicycle sprocket according to any one of the second to twelfth aspects is configured so that the first and second arms are symmetrically arranged with respect to a first reference plane including the rotational center axis.

According to the thirteenth aspect of the present invention, it is possible to effectively reinforce the rigidity of a bicycle sprocket.

In accordance with a fourteenth aspect of the present invention, the bicycle sprocket according to the thirteenth aspect is configured so that the first reference plane extends parallel to a longitudinal direction of a crank arm in a mounted state where the bicycle sprocket is mounted to the crank arm.

According to the fourteenth aspect of the present invention, it is possible reinforce rigidity of a bicycle sprocket to effectively transmit a pedaling force to a bicycle chain via the bicycle sprocket.

In accordance with a fifteenth aspect of the present invention, the bicycle sprocket according to the thirteenth or fourteenth aspect is configured so that the rib includes a first rib at least partially extending in a direction perpendicular to the first reference plane.

According to the fifteenth aspect of the present invention, it is possible reinforce rigidity of a bicycle sprocket to effectively transmit a pedaling force to a bicycle chain via the bicycle sprocket.

In accordance with a sixteenth aspect of the present invention, the bicycle sprocket according to any one of the second to fifteenth aspects is configured so that the intermediate portion includes a third arm and a fourth arm. The central portion is at least partially disposed between the third and fourth arms.

According to the sixteenth aspect of the present invention, it is possible to further reinforce the rigidity of a bicycle sprocket to effectively transmit a pedaling force to a bicycle chain via the bicycle sprocket.

In accordance with a seventeenth aspect of the present invention, the bicycle sprocket according to the sixteenth aspect is configured so that the third and fourth arms are disposed opposite sides with respect to a first reference plane including the rotational center axis, and the first and second arms are disposed on opposite side of the third and fourth arms with respect to a second reference plane that is perpendicular to the first reference plane and that includes the rotational center axis.

According to the seventeenth aspect of the present invention, it is possible to further reinforce the rigidity of a bicycle sprocket to effectively transmit a pedaling force to a bicycle chain via the bicycle sprocket.

In accordance with an eighteenth aspect of the present invention, the bicycle sprocket according to the seventeenth aspect is configured so that the rib includes a second rib extending from the third arm to the fourth arm in a direction perpendicular to the rotational center axis.

According to the eighteenth aspect of the present invention, it is possible to further reinforce the rigidity of a bicycle sprocket to effectively transmit a pedaling force to a bicycle chain via the bicycle sprocket.

In accordance with a nineteenth aspect of the present invention, the bicycle sprocket according to the eighteenth aspect is configured so that the first and second ribs are symmetrically disposed each other with respect to the rotational center axis.

According to the nineteenth aspect of the present invention, it is possible to further reinforce rigidity of a bicycle sprocket to effectively transmit a pedaling force to a bicycle chain via the bicycle sprocket.

In accordance with a twentieth aspect of the present invention, the bicycle sprocket according to any one of the seventeenth to nineteenth aspects is configured so that the first and second arms define a first intermediate opening therebetween and the first and third arms define a second intermediate opening therebetween.

According to the twentieth aspect of the present invention, it is possible to further reinforce rigidity of a bicycle sprocket to effectively transmit a pedaling force to a bicycle chain via the bicycle sprocket.

In accordance with a twenty-first aspect of the present invention, the bicycle sprocket according to the twentieth aspect is configured so that the first intermediate opening has a maximum circumferential length that is larger than a maximum circumferential length of the second intermediate opening.

According to the twenty-first aspect of the present invention, it is possible to further reinforce rigidity of a bicycle sprocket to effectively transmit a pedaling force to a bicycle chain via the bicycle sprocket.

In accordance with a twenty-second aspect of the present invention, the bicycle sprocket according to the twentieth aspect is configured so that the rib includes a third rib extending along at least part of an outer periphery of the second intermediate opening.

According to the twenty-second aspect of the present invention, it is possible to reinforce around the second intermediate opening. Therefore, it is possible to reduce a weight of a bicycle sprocket while maintaining stiffness and strength of the bicycle sprocket.

In accordance with a twenty-third aspect of the present invention, the bicycle sprocket according to the twenty-second aspect is configured so that the third rib has a radially outer portion that extends along a radially outer edge of the second intermediate opening.

According to the twenty-third aspect of the present invention, it is possible to reinforce an outer periphery of a bicycle sprocket.

In accordance with a twenty-fourth aspect of the present invention, the bicycle sprocket according to the twenty-third aspect is configured so that the third rib has a radially inner portion that extends along a radially inner edge of the second intermediate opening.

According to the twenty-fourth aspect of the present invention, it is possible to reinforce a first arm of a bicycle sprocket.

In accordance with a twenty-fifth aspect of the present invention, the bicycle sprocket according to the twenty-fourth aspect is configured so that the radially inner portion has an axial height that is larger than an axial height of the radially outer portion.

According to the twenty-fifth aspect of the present invention, it is possible to reinforce radially inward portion of a first arm of a bicycle sprocket.

In accordance with a twenty-sixth aspect of the present invention, the bicycle sprocket according to any one of the twenty-second to twenty-fifth aspects is configured so that the rib includes a first rib extending from the first arm to the second arm in a direction perpendicular to the rotational center axis, and the third rib is connected to the first rib.

According to the twenty-sixth aspect of the present invention, it is possible to reinforce around the second intermediate opening. Therefore, it is possible to reduce a weight of a bicycle sprocket while maintaining stiffness and strength of the bicycle sprocket.

In accordance with a twenty-seventh aspect of the present invention, the bicycle sprocket according to the twenty-sixth aspect is configured so that the first arm includes a first arm opening disposed radially inward of the first rib with respect to the rotational center axis.

According to the twenty-seventh aspect of the present invention, it is possible to reduce weight of a bicycle sprocket and reinforce a first arm around a first arm opening.

In accordance with a twenty-eighth aspect of the present invention, the bicycle sprocket according to the twenty-seventh aspect is configured so that the rib includes a first extending portion disposed radially inward of the first rib.

According to the twenty-eighth aspect of the present invention, it is possible to reinforce a first arm around a first arm opening.

In accordance with a twenty-ninth aspect of the present invention, the bicycle sprocket according to the twenty-eighth aspect is configured so that the first extending portion extends along at least part of an outer periphery of the first arm opening.

According to the twenty-ninth aspect of the present invention, it is possible to reinforce a first arm around a first arm opening.

In accordance with a thirtieth aspect of the present invention, the bicycle sprocket according to any one of the first to twenty-ninth aspects is configured so that at least part of the rib extends in a direction perpendicular to a first reference plane extending parallel to a longitudinal direction of a crank arm in a mounted state where the bicycle sprocket is mounted to the crank arm.

According to the thirtieth aspect of the present invention, it is possible to reinforce rigidity of a bicycle sprocket to effectively transmit a pedaling force to a bicycle chain via the bicycle sprocket.

In accordance with a thirty-first aspect of the present invention, the bicycle sprocket according to any one of the first to thirtieth aspects is configured so that the other of the at least one of the first and second side surfaces is configured to face the crank arm that engages with the central opening in a mounted state where the bicycle sprocket is mounted to the crank arm.

According to the thirty-first aspect of the present invention, it is possible to reinforce a rigidity of a bicycle sprocket without interference between a crank arm and the rib.

In accordance with a thirty-second aspect of the present invention, the bicycle sprocket according to any one of the first to thirty-first aspects is configured so that the plurality of chain-driving teeth includes at least one first tooth having a first maximum chain-engaging width defined in the axial direction, and at least one second tooth having a second maximum chain-engaging width defined in the axial direction. The second maximum chain-engaging width is smaller than the first maximum chain-engaging width.

According to the thirty-second aspect of the present invention, it is possible to lower a risk of chain-dropping.

In accordance with a thirty-third aspect of the present invention, the bicycle sprocket according to the thirty-second aspect is configured so that the first maximum chain-engaging width is larger than an inner link space defined between an opposed pair of inner link plates of the bicycle chain in the axial direction and smaller than an outer link space defined between an opposed pair of outer link plates of the bicycle chain in the axial direction, and the second maximum chain-engaging width is smaller than the inner link space.

According to the thirty-third aspect of the present invention, it is possible to lower a risk of chain-dropping.

Also, other objects, features, aspects and advantages of the disclosed bicycle sprocket will become apparent to those skilled in the art from the following detailed description, which, taken in conjunction with the annexed drawings, discloses illustrative embodiments of the bicycle sprockets.

BRIEF DESCRIPTION OF THE DRAWINGS

Referring now to the attached drawings which form a part of this original disclosure.

7

Figure 1:
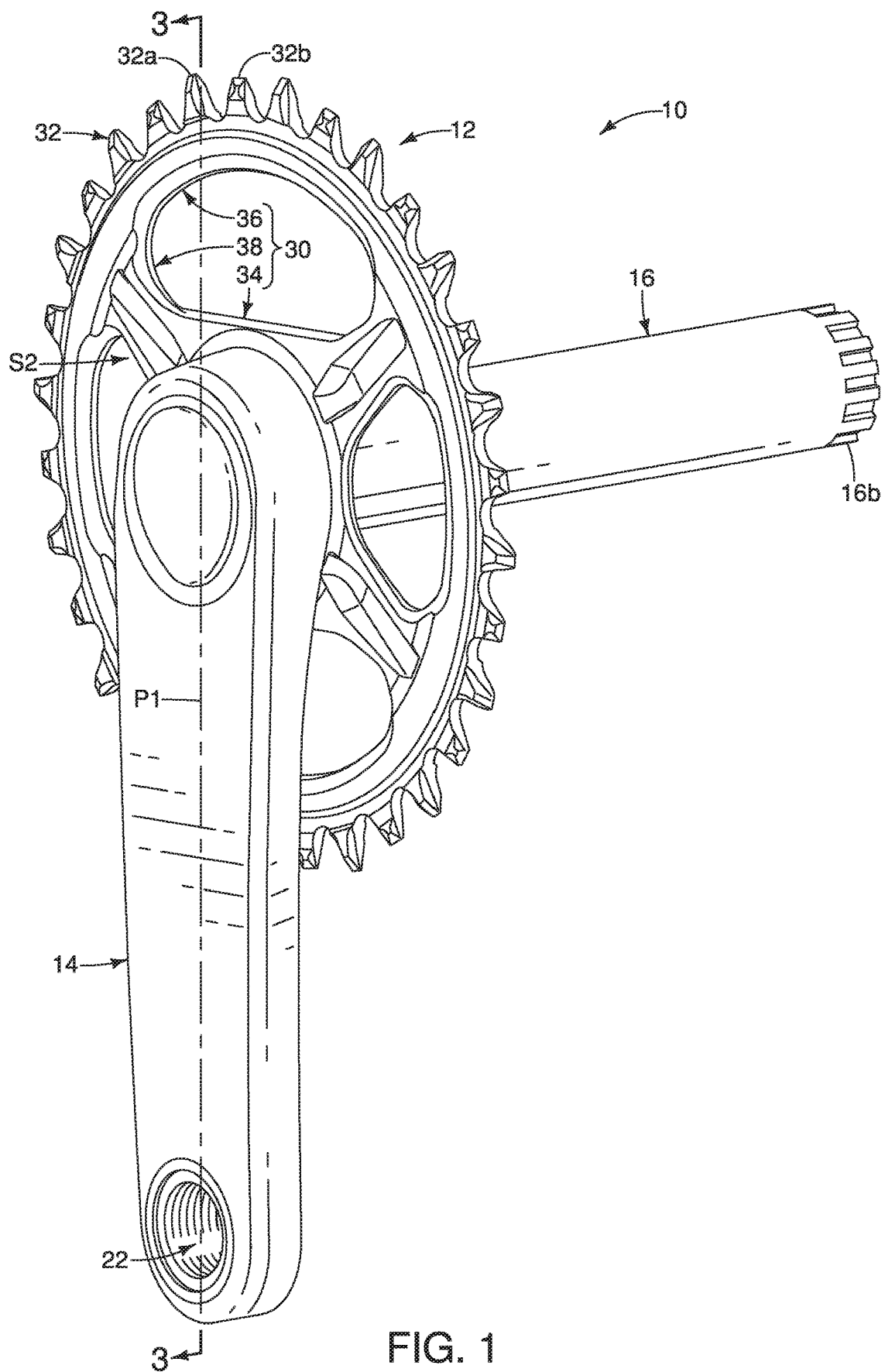
FIG. 1 is an outside (a non-frame facing side) perspective view of a bicycle crank assembly having a bicycle sprocket in accordance with a first illustrated embodiment.
Figure 2:
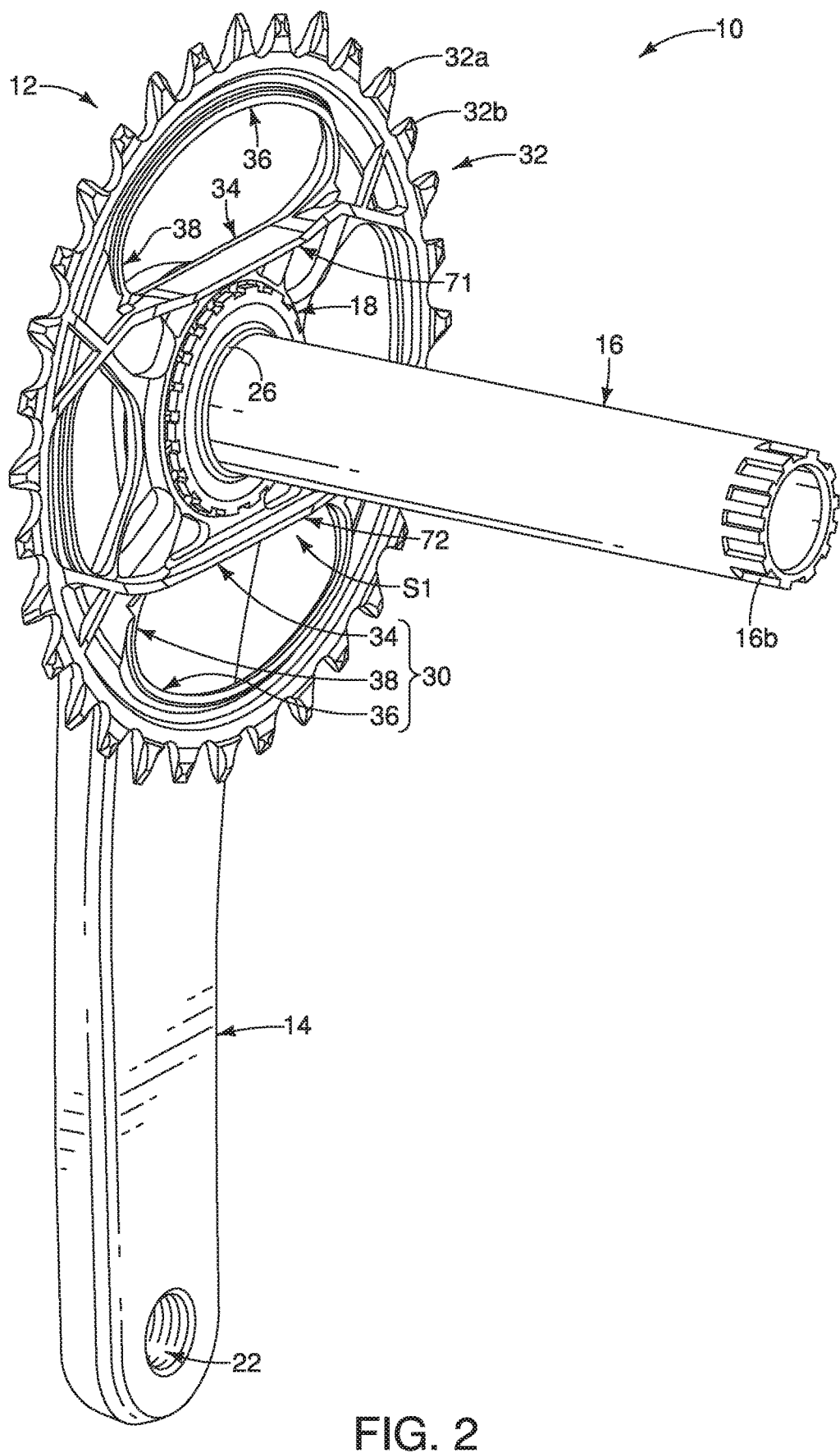
Figure 3:
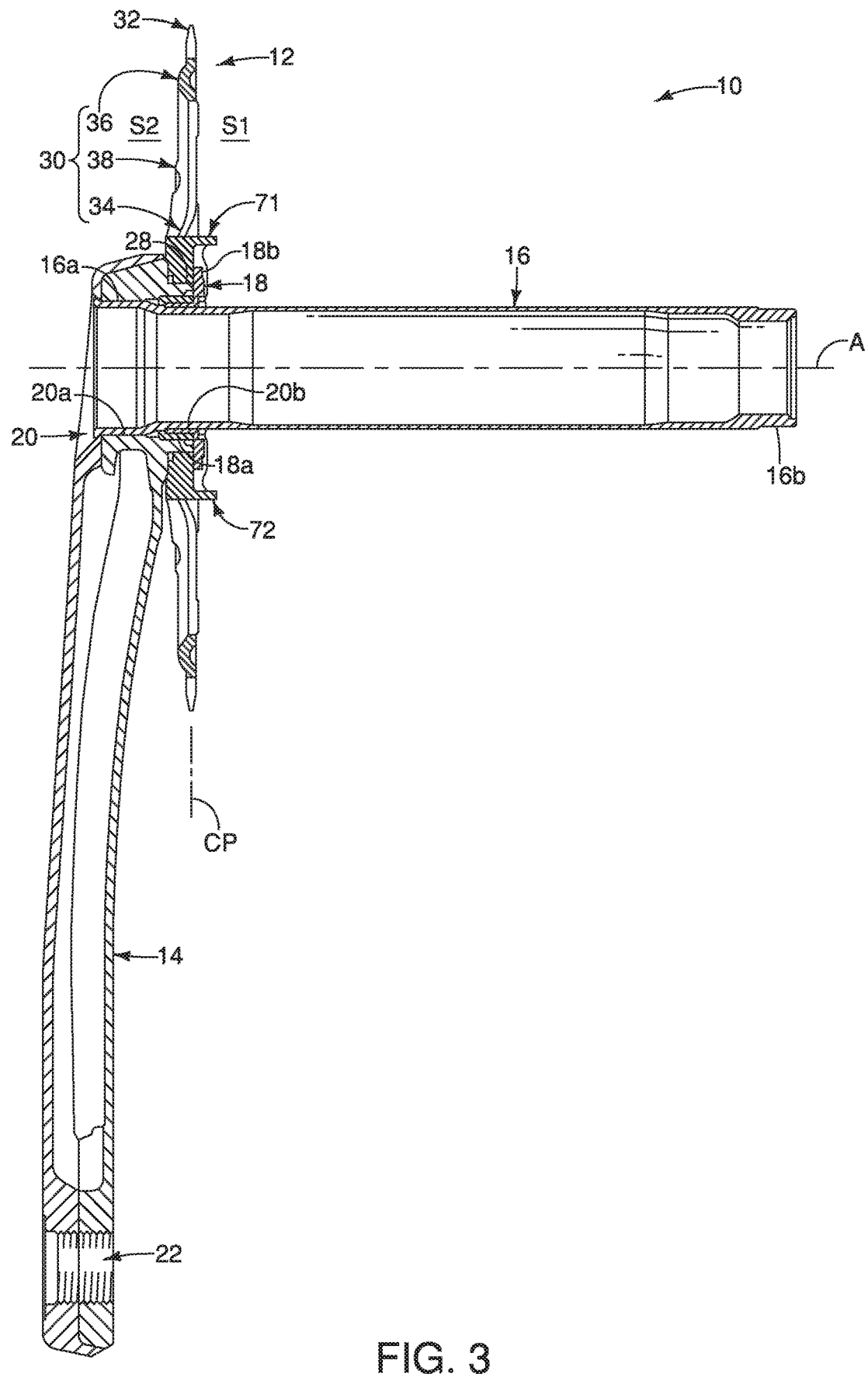
Figure 4:
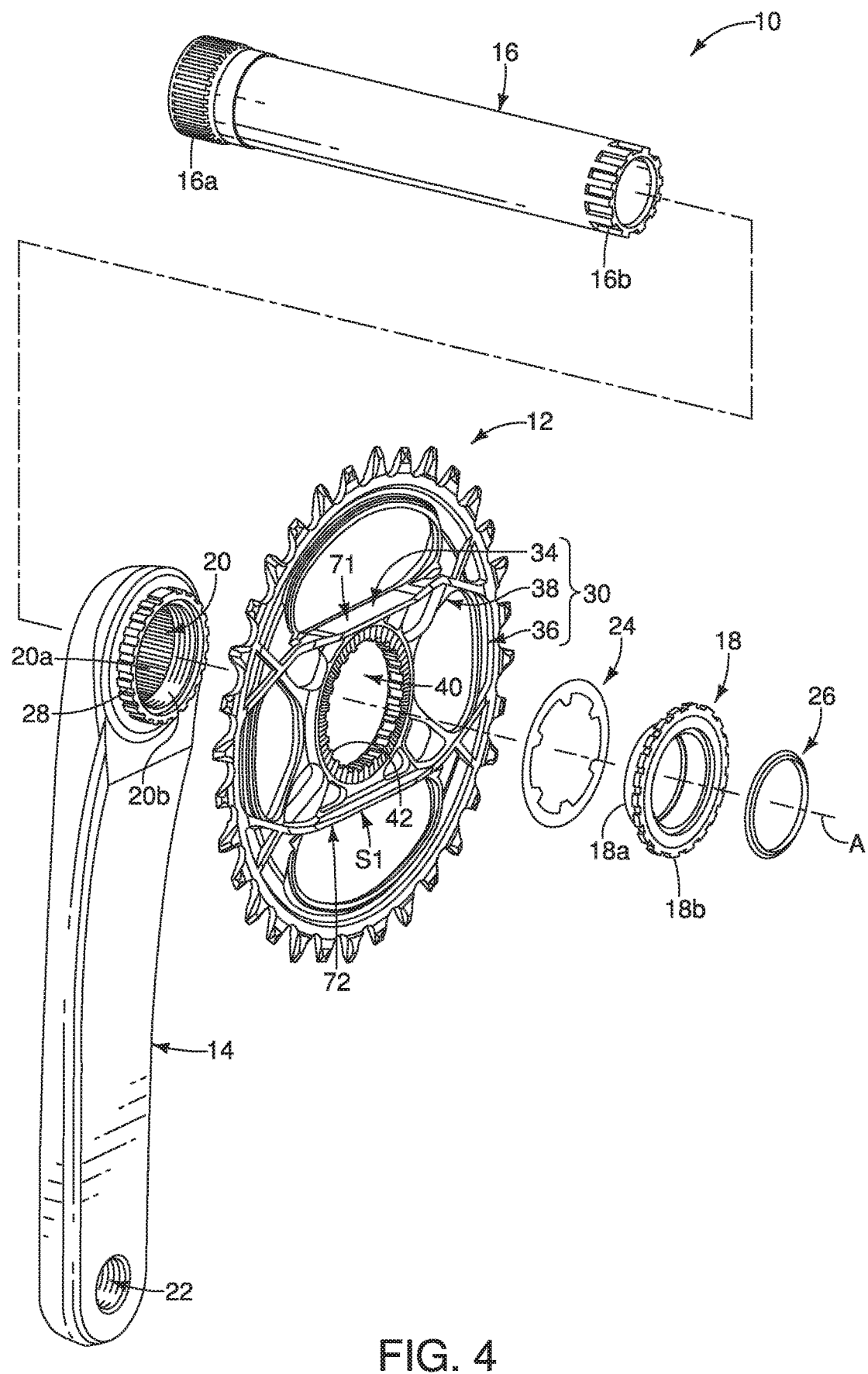
Figure 5:
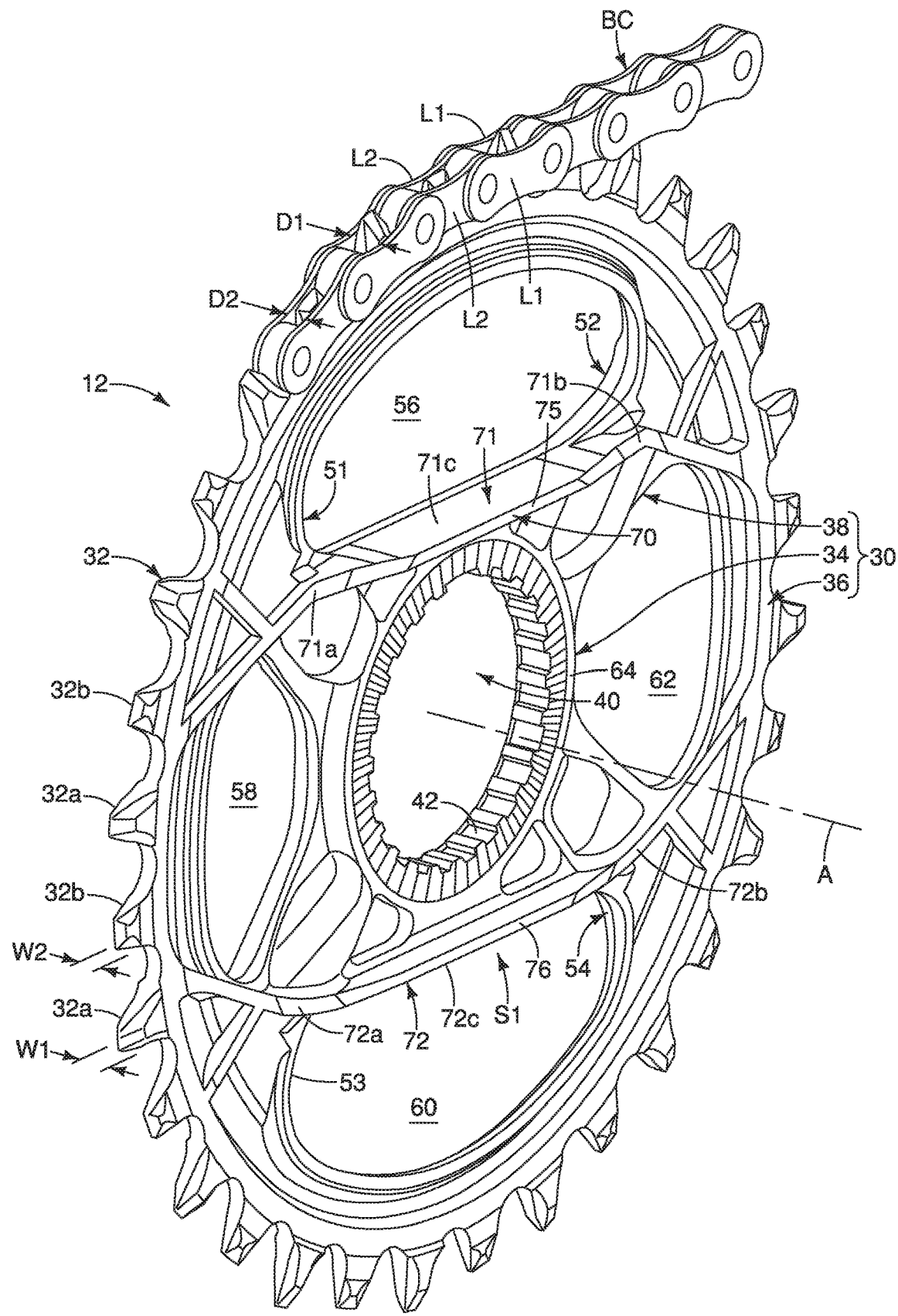
Figure 6:
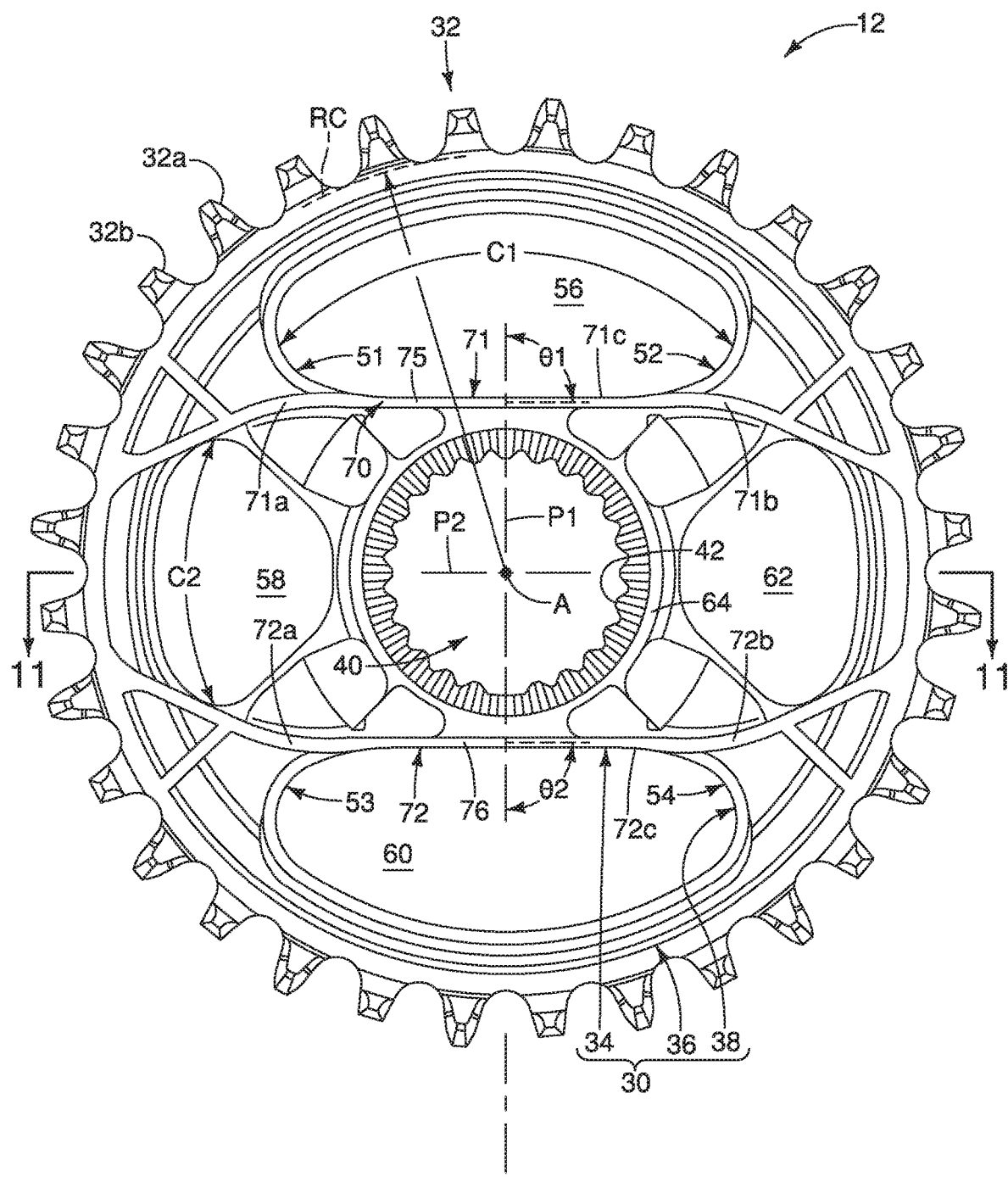
Figure 7:
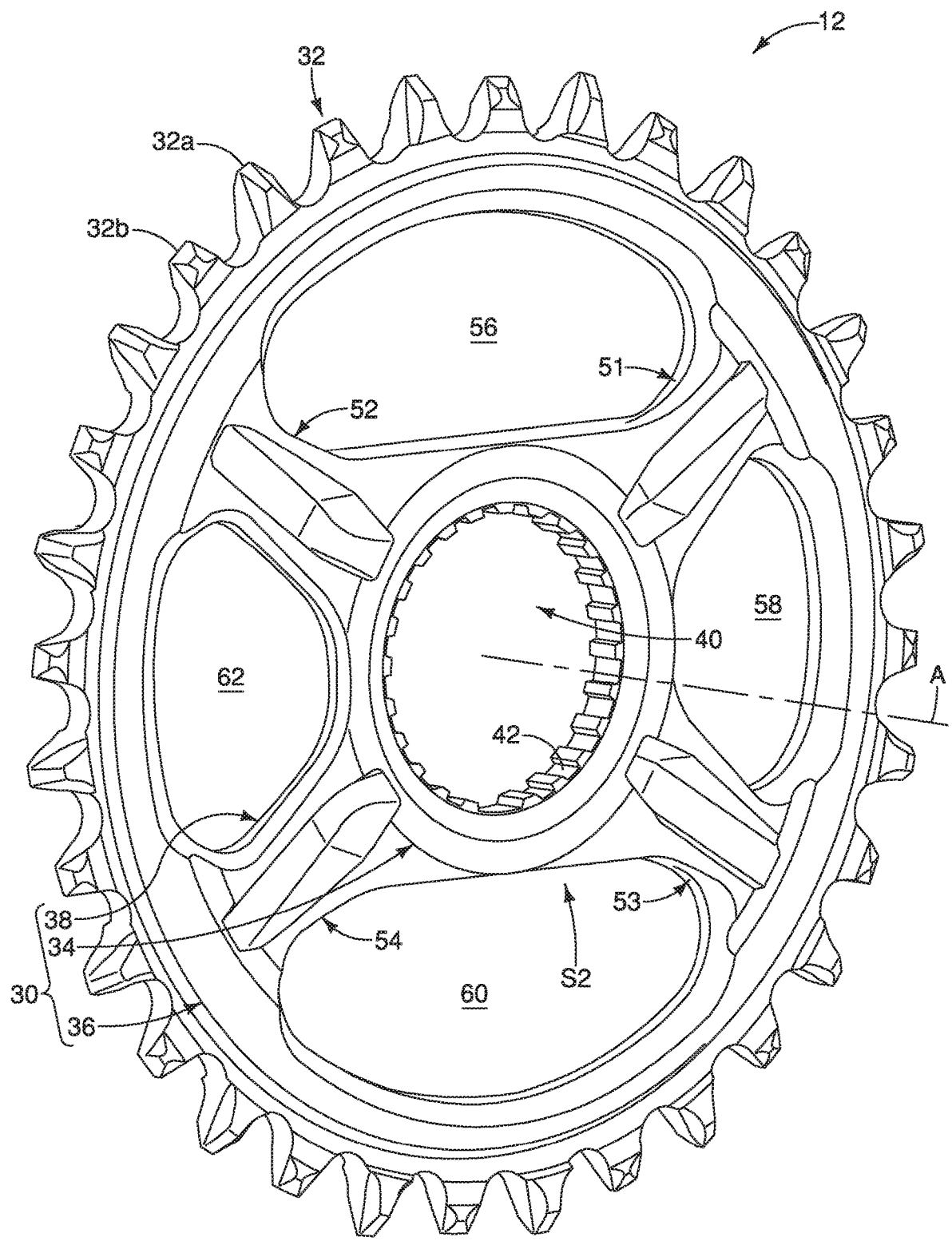
Figure 8:
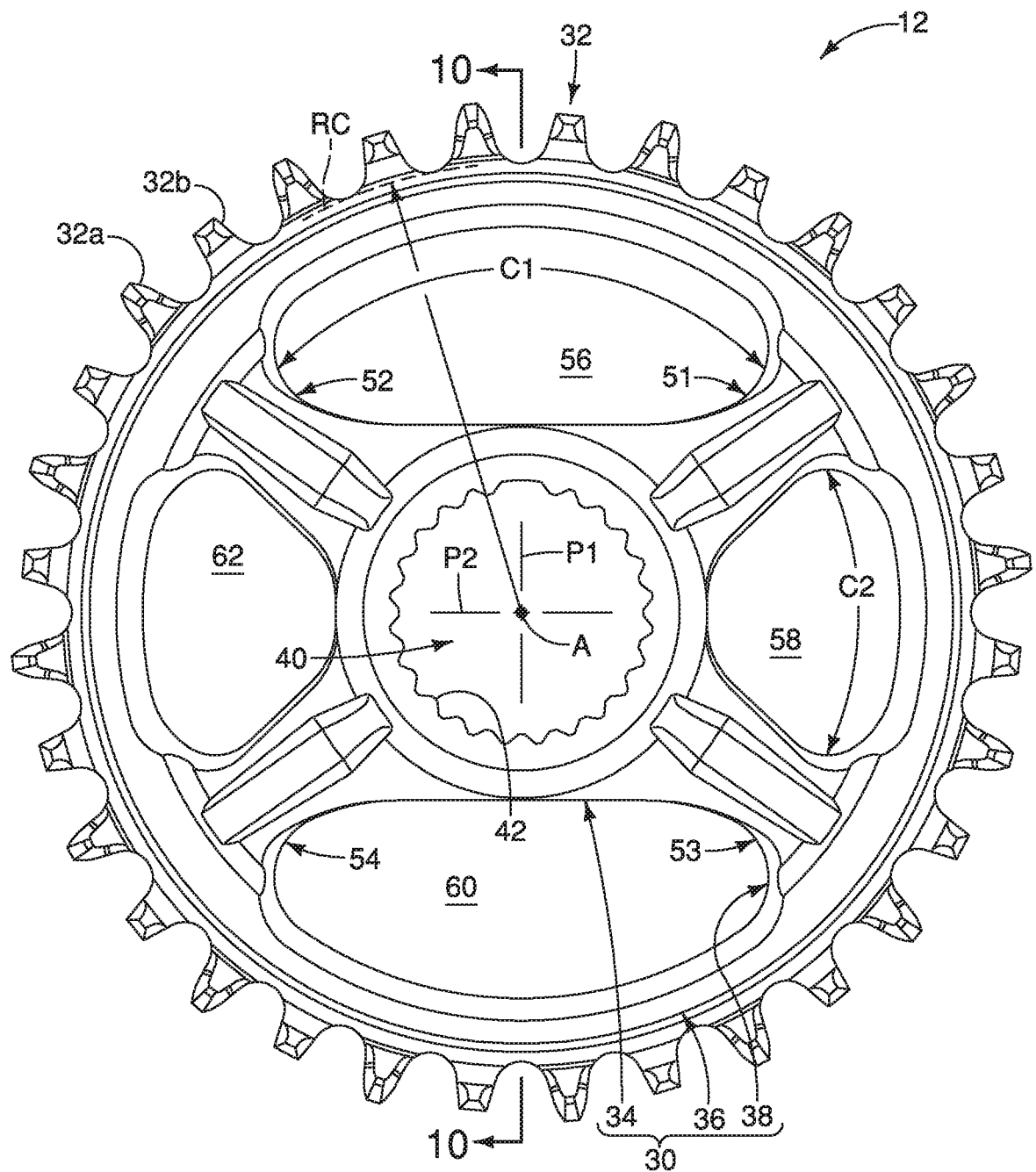
Figure 9:
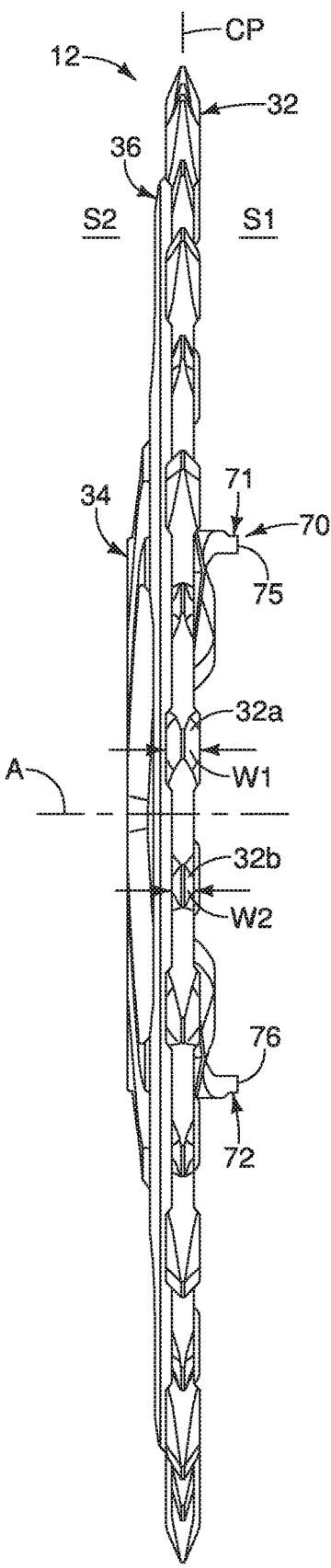
Figure 10:
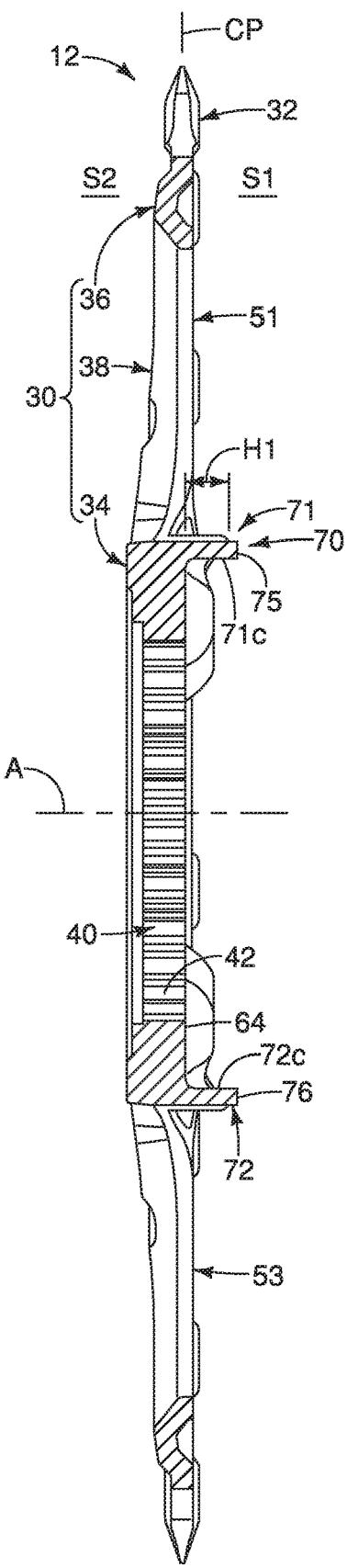
Figure 11:
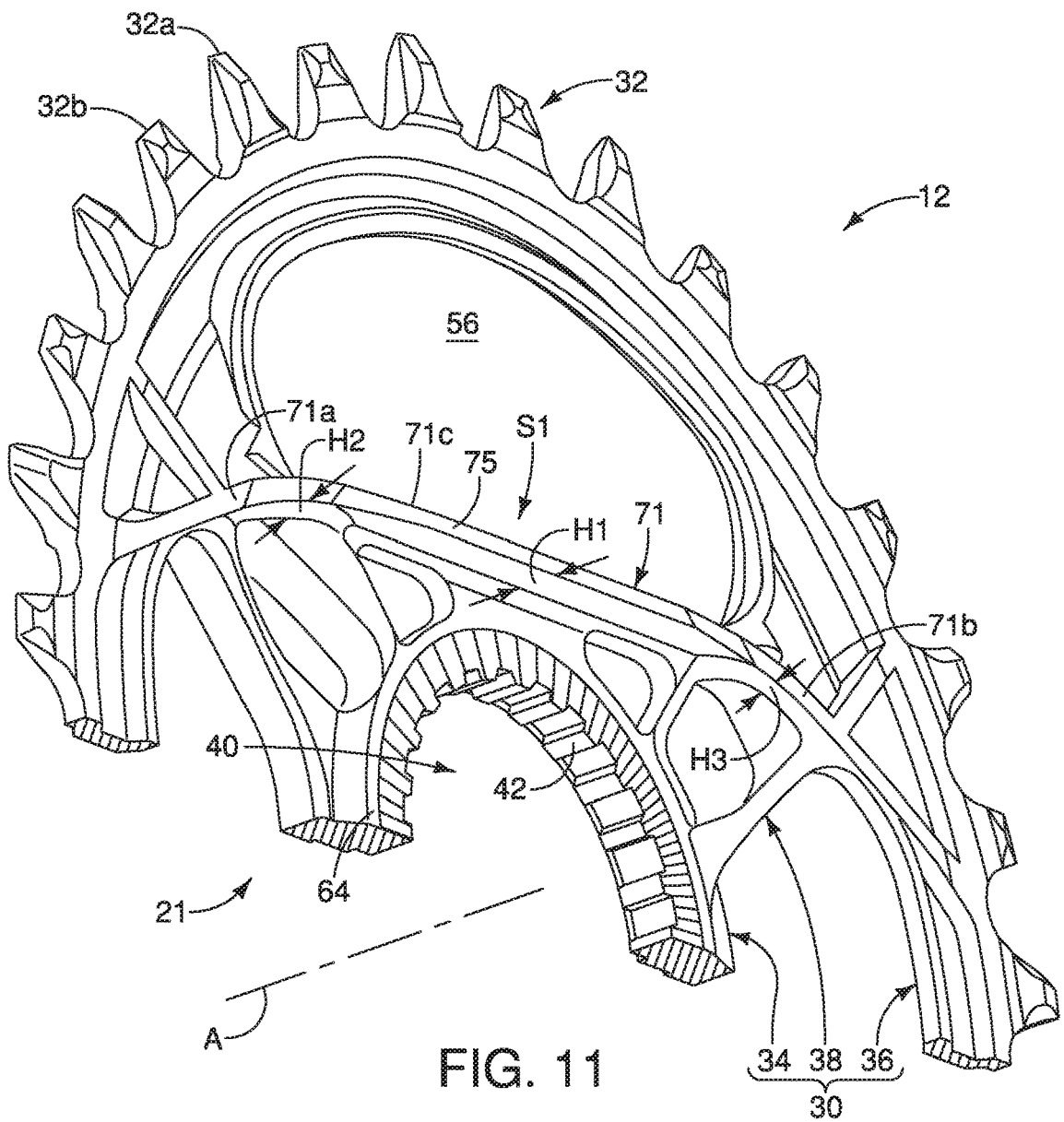
Figure 12:
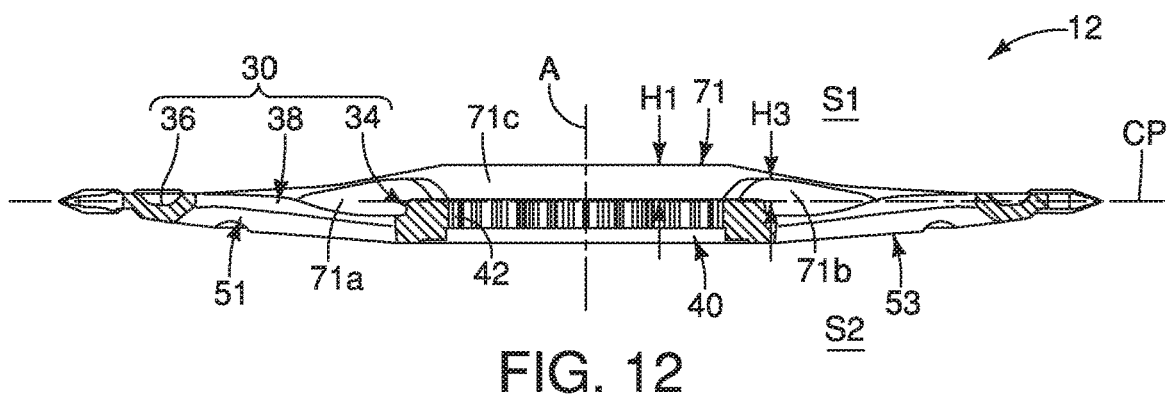
Figure 13:
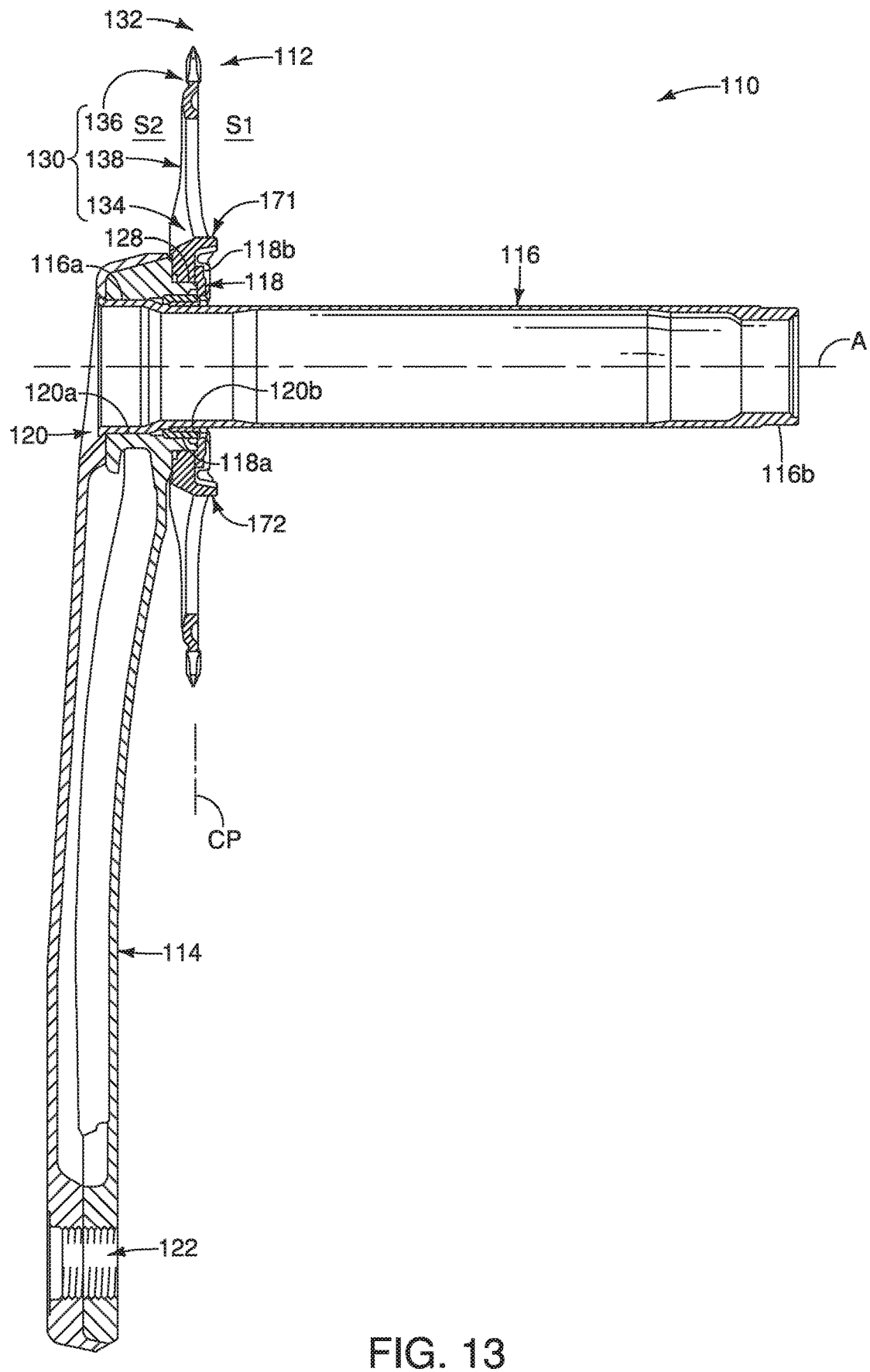
Figure 14:
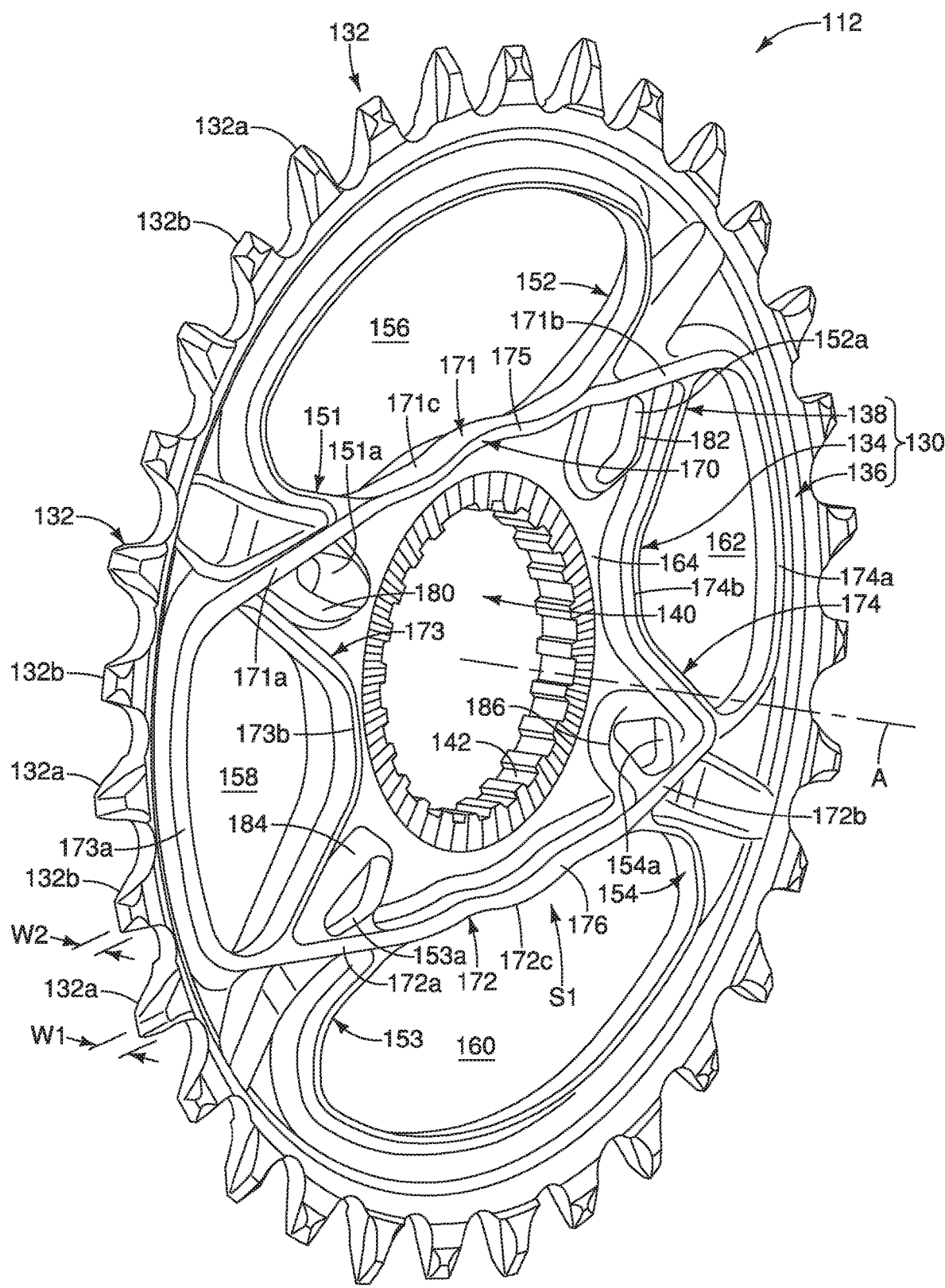
Figure 15:
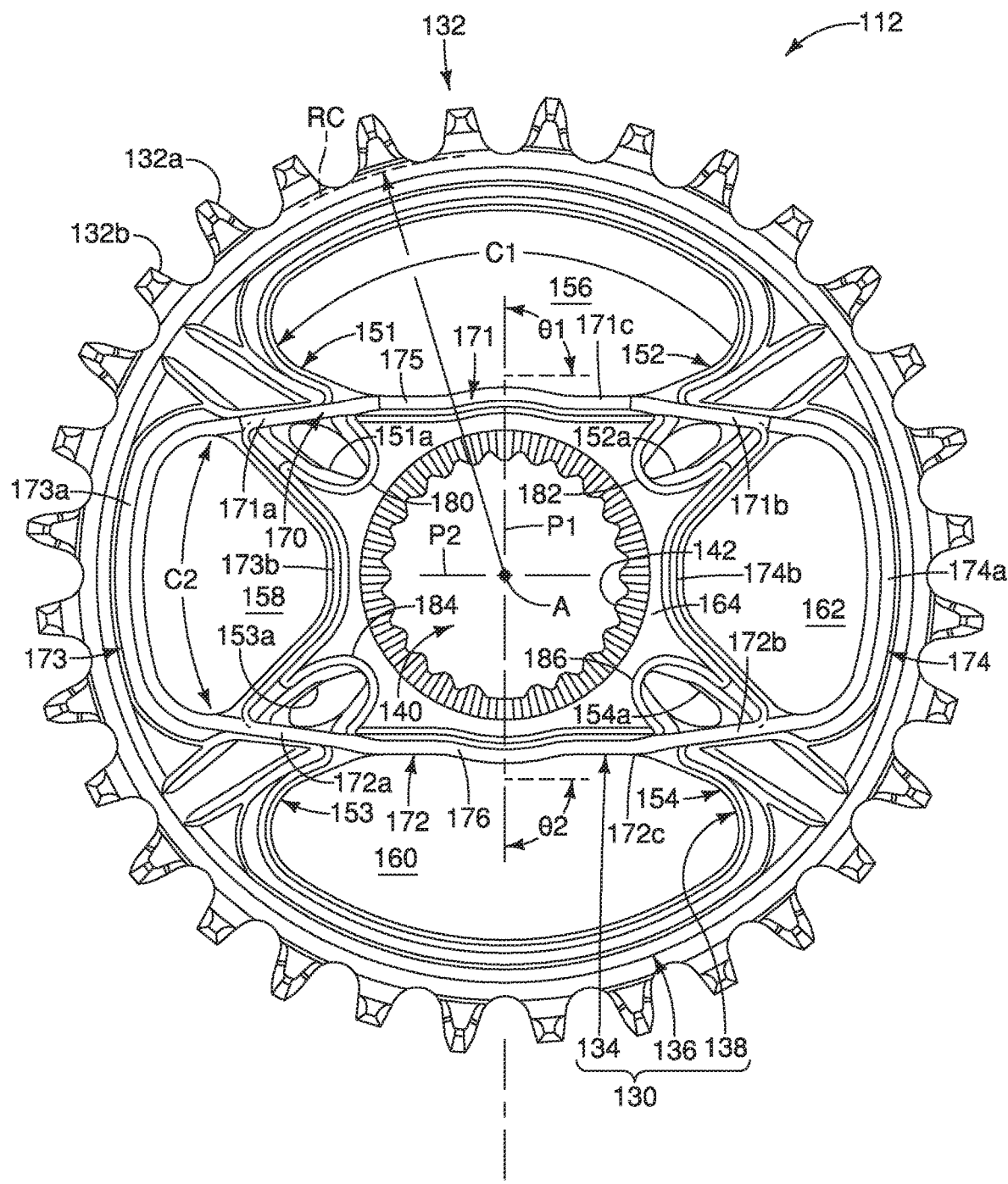
Figure 16:
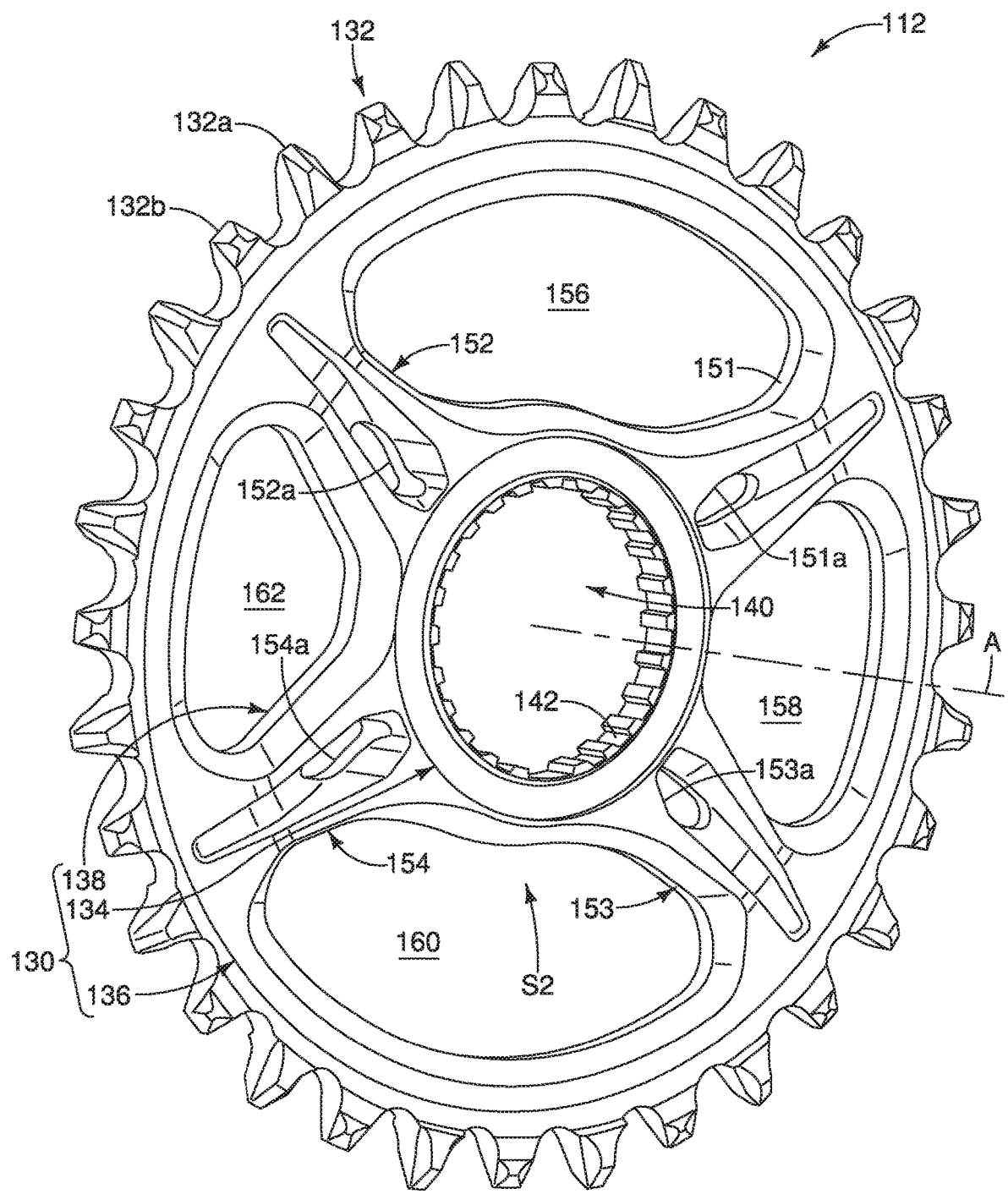
Figure 17:
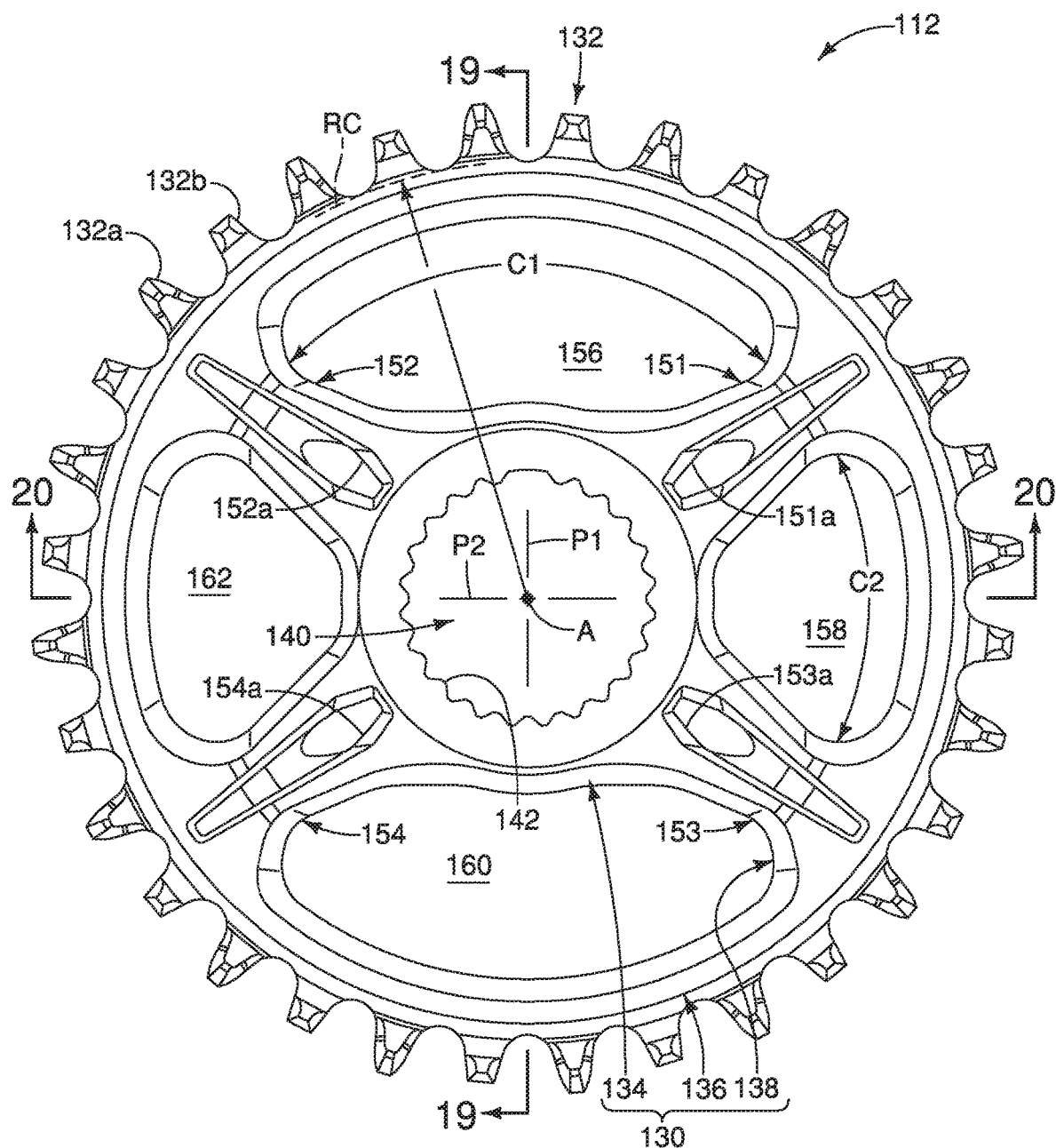
Figure 18:
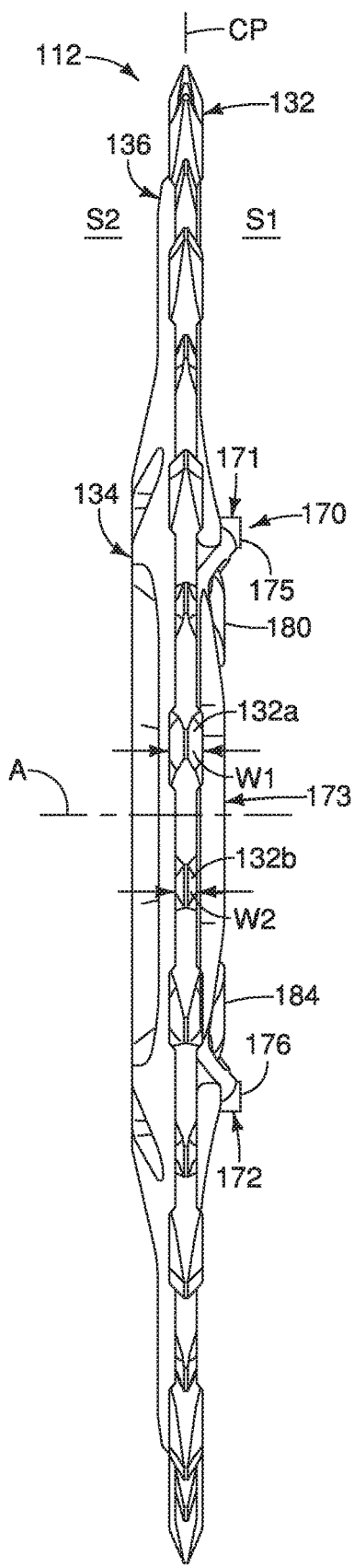
Figure 19:
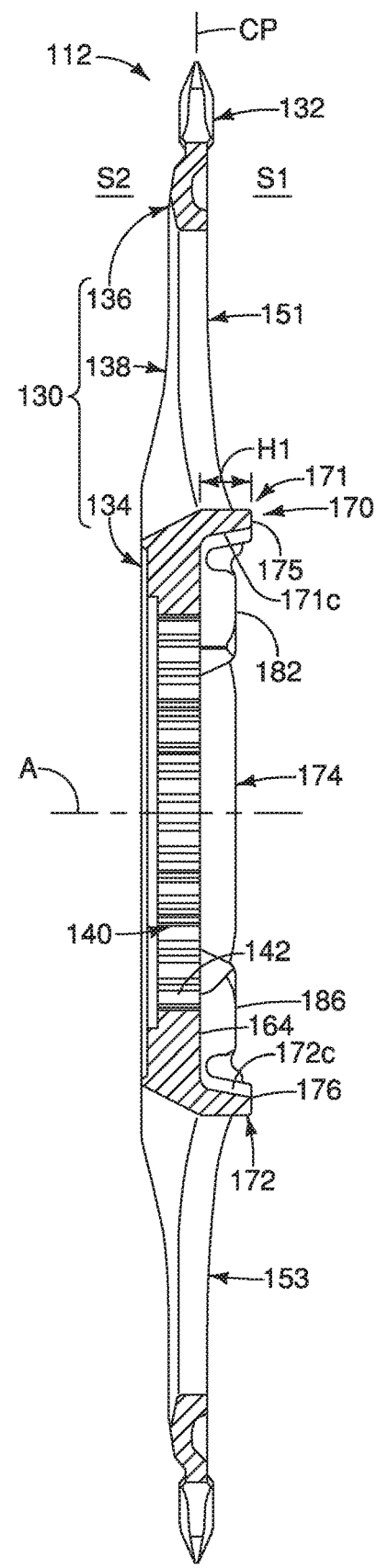
Figure 20:
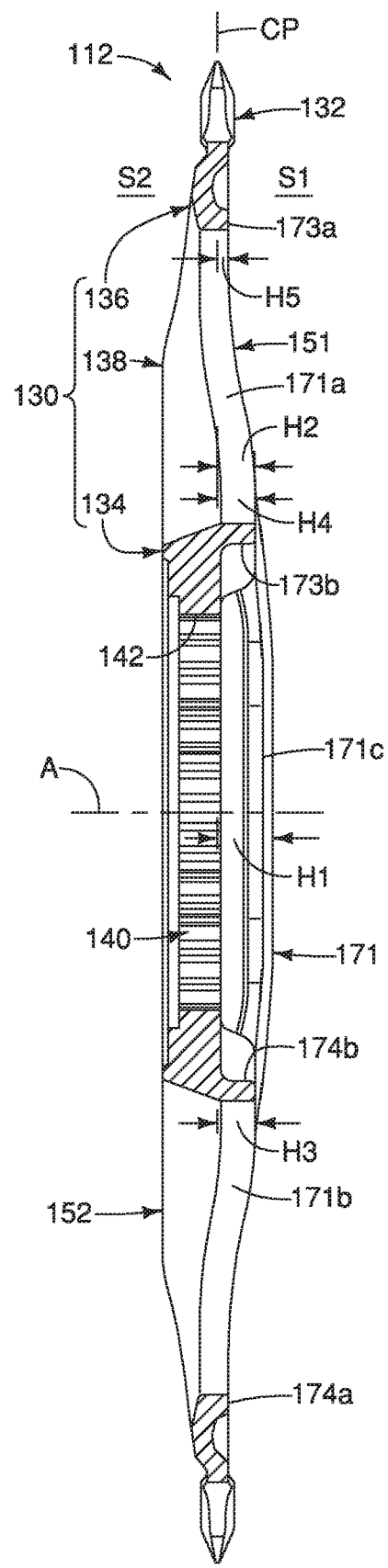

FIG. 2 is an inside (a frame facing side) perspective view of the bicycle crank assembly having the bicycle sprocket illustrated in FIG. 1;

FIG. 3 is a cross sectional view of the bicycle crank assembly illustrated in FIGS. 1 and 2 as seen along section line 3-3 of FIG. 1;

FIG. 4 is an exploded perspective view of the bicycle crank assembly having the bicycle sprocket illustrated in FIGS. 1 to 3;

FIG. 5 is a frame facing side perspective view of the bicycle sprocket illustrated in FIGS. 1 to 4;

FIG. 6 is a frame facing side elevational view of the bicycle sprocket illustrated in FIGS. 1 to 5;

FIG. 7 is a non-frame facing side perspective view of the bicycle sprocket illustrated in FIGS. 1 to 6;

FIG. 8 is a non-frame facing side elevational view of the bicycle sprocket illustrated in FIGS. 1 to 7;

FIG. 9 is an edge elevational view of the bicycle sprocket illustrated in FIGS. 1 to 8;

FIG. 10 is a cross sectional view of the bicycle sprocket illustrated in FIGS. 1 to 9 as seen along section line 10-10 of FIG. 8;

FIG. 11 is a perspective cross sectional view of the bicycle sprocket illustrated in FIGS. 1 to 9 as seen along section line 11-11 of FIG. 6;

FIG. 12 is a cross sectional view of the bicycle sprocket illustrated in FIGS. 1 to 9 as seen along section line 11-11 of FIG. 6;

FIG. 13 is a cross sectional view of a bicycle crank assembly having a bicycle sprocket in accordance with a second illustrated embodiment;

FIG. 14 is a frame facing side perspective view of the bicycle sprocket illustrated in FIG. 13;

FIG. 15 is a frame facing side elevational view of the bicycle sprocket illustrated in FIGS. 13 and 14;

FIG. 16 is a non-frame facing side perspective view of the bicycle sprocket illustrated in FIGS. 13 to 15;

FIG. 17 is a non-frame facing side elevational view of the bicycle sprocket illustrated in FIGS. 13 to 16;

FIG. 18 is an edge elevational view of the bicycle sprocket illustrated in FIGS. 13 to 17;

FIG. 19 is a cross sectional view of the bicycle sprocket illustrated in FIGS. 13 to 18 as seen along section line 19-19 of FIG. 17; and FIG. 20 is a cross sectional view of the bicycle sprocket illustrated in FIGS. 13 to 19 as seen along section line 20-20 of FIG. 19.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 4, a bicycle crank assembly 10 is illustrated that includes a bicycle sprocket 12 in accordance with a first illustrated embodiment. The bicycle crank assembly 10 further includes a crank arm 14 and a crank axle 16. Here, the crank arm 14 is a right crank arm. The crank arm 14 is rigidly fixed to a first (right) end of the crank axle 16 in a conventional manner (e.g., crimping, locking ring, press-fitting, adhesive, etc.). The crank arm. 14 extends radially outward from the crank axle 16. A left crank arm (not shown) is fixed to a second (left) end of the crank axle 16 in a releasable and reinstallable manner (e.g., clamping or other suitable arrangement). The bicycle sprocket 12 is attached to the crank arm 14 by a fixing bolt 18. Alternatively, the bicycle sprocket 12 is attached to the crank arm 14 by a lock ring. While the bicycle crank assembly 10 is illustrated with only a single bicycle sprocket (i.e., the bicycle sprocket 12), it will be apparent to those skilled in the bicycle field from this disclosure that the bicycle crank assembly 10 can have two or more bicycle sprockets.

As seen in FIG. 4, the crank arm 14 has a crank axle receiving opening 20 at one end and a threaded pedal axle receiving hole 22 at the other end. Here, the crank axle receiving opening 20 has a plurality of internal splines 20a and an internal thread 20b. The crank axle 16 has a plurality of external splines 16a that engage the internal splines 20a of the crank arm 14 to prevent relative rotation between the crank arm 14 and the crank axle 16. The fixing bolt 18 has an external thread 18a that is screwed into the internal thread 20b of the crank arm 14 to attach the bicycle sprocket 12 to the crank arm 14. Here, an internal tooth lock washer 24 is provided between a head portion 18b of the fixing bolt 18 and the bicycle sprocket 12. Preferably, a sealing ring 26 is provided between the head portion 18b of the fixing bolt 18 and crank axle 16. The crank axle 16 also has a plurality of external splines 16b that engage internal splines of the left crank arm (not shown) to prevent relative rotation between the left crank arm and the crank axle 16. The crank arm 14 also has a plurality of external splines 28 for engaging with the bicycle sprocket 12 to prevent relative rotation between the bicycle sprocket 12 and the crank arm 14. The external splines 28 extend in an axial direction that is parallel to a rotational center axis A of the bicycle sprocket 12.

Referring now to FIGS. 5 to 12, the bicycle sprocket 12 will now be discussed in more detail. In the first embodiment, the bicycle sprocket 12 is a rigid member made of a suitable rigid material such as a rigid metallic material. The bicycle sprocket 12 basically comprises a sprocket body 30 and a plurality of chain-driving teeth 32. Here, the sprocket body 30 and the chain-driving teeth 32 are formed as a one-piece, unitary member that is preferably formed of a suitable metallic material such as a stainless steel, an aluminum alloy, a magnesium alloy, a titanium alloy, etc. Basically, the sprocket body 30 includes a central portion 34, an annular portion 36 and an intermediate portion 38.

As seen in FIG. 5, the chain-driving teeth 32 extend radially outward from the annular portion 36 of the sprocket body 30 to engage with a bicycle chain BC (only a portion shown). The chain-driving teeth 32 include at least one first tooth 32a and at least one second tooth 32b. The at least one first tooth 32a has a first maximum chain-engaging width W1 defined in the axial direction, and the at least one second tooth 32b has a second maximum chain-engaging width W2 defined in the axial direction. The second maximum chain-engaging width W2 is smaller than the first maximum chain-engaging width W1. Preferably, the chain-driving teeth 32 include a plurality of the first teeth 32a and a plurality of the second teeth 32b. More preferably, the first and second teeth 32a and 32b are alternatively arranged along an outer periphery of the annular portion 36 of the sprocket body 30. In this way, the first teeth 32a engage outer links of the bicycle chain BC, while the second teeth 32b engage inner links of the bicycle chain BC during driving the bicycle chain BC. In particular, the first maximum chain-engaging width W1 is smaller than an outer link space D1 defined between an opposed pair of outer link plates L1 of the bicycle chain BC in the axial direction. The first maximum chain-engaging width W1 is larger than an inner link space D2 defined between an opposed pair of inner link plates L2 of the bicycle chain BC in the axial direction. The second maximum chain-engaging width W2 is smaller than the inner link space D2.

As seen in FIGS. 5 to 10, the sprocket body 30 has a rotational center axis A, a first side surface S1 and a second side surface S2. The second side surface S2 is opposite to the first side surface S1 with respect to an axial direction parallel to the rotational center axis A. In other words, the first and second side surfaces S1 and S2 face in opposite axial directions of the bicycle sprocket 12. Here, in the first embodiment, the first side surface S1 corresponds to a frame facing side of the sprocket body 30, while the second side surface S2 corresponds to a non-frame facing side of the sprocket body 30. The second side surface S2 faces axially outside of the bicycle crank assembly 10.

As seen in FIGS. 9 and 10, the sprocket body 30 has a center plane CP perpendicular to the rotational center axis A. The center plane CP is a plane defined by an axial midpoint bisecting the sprocket body 30 in the axial direction between the first and second side surfaces S1 and S2. Here, the center plane CP also bisects the chain-driving teeth 32. However, the center plane CP can be offset from an axial center plane of the chain-driving teeth 32. As seen in FIGS. 6 and 8, a root circle RC of the chain-driving teeth 32 defines the dividing line between the sprocket body 30 and the chain-driving teeth 32. The root circle RC is a hypothetical circle that is centered on the rotational center axis A defined at the bottom troughs of the tooth spaces between the chain-driving teeth 32.

As seen in FIG. 10, the center plane CP bisects the central portion 34 of the sprocket body 30. As seen in FIGS. 5 to 8, the central portion 34 has a central opening 40 through which the rotational center axis A passes. Here, the central portion 34 has a plurality of internal splines 42 for engaging the external splines 28 of the crank arm 14 to prevent relative rotation between the bicycle sprocket 12 and the crank arm 14. The internal splines 42 extend in the axial direction. The internal splines 42 are disposed around an inner circumference of the central opening 40. The annular portion 36 is disposed radially outward from the central portion 34 with respect to the rotational center axis A. The intermediate portion 38 extends between the central portion 34 and the annular portion 36 in a radial direction about the rotational center axis A.

While intermediate portion 38 can be formed as a single disc extending radially between the central portion 34 and the annular portion 36, preferably the intermediate portion 38 is formed with two or more arms. The intermediate portion 38 includes a first arm 51 and a second arm 52. More preferably, the intermediate portion 38 includes a third arm 53 and a fourth arm 54. The first and second arms 51 and 52 at least partially define a first intermediate opening 56 therebetween. The first and third arms 51 and 53 at least partially define a second intermediate opening 58 therebetween. The third and fourth arms 53 and 54 at least partially define a third intermediate opening 60 therebetween. The second and fourth arms 52 and 54 at least partially define a fourth intermediate opening 62 therebetween. In other words, the first intermediate opening 56 is adjacent to the first and second arms 51 and 52 in the circumferential direction of the rotational center axis A. The second intermediate opening 58 is adjacent to the first and third arms 51 and 53 in the circumferential direction. The third intermediate opening 60 is adjacent to the third and fourth arms 53 and 54 in the circumferential direction of the rotational center axis A. The fourth intermediate opening 62 is adjacent to the second and fourth arms 52 and 54 in the circumferential direction. The first intermediate opening 56 has a maximum circumferential length C1 that is larger than a maximum circumferential length C2 of the second intermediate opening 58. Here, the first and third intermediate openings 56 and 60 are mirror images, and the second and fourth intermediate openings 58 and 62 are mirror images. In other words, the first and third intermediate openings 56 and 60 have the same shape and dimensions, and the second and fourth intermediate openings 58 and 62 have the same shape and dimensions. The first and second arms 51 and 52 are symmetrically arranged with respect to a first reference plane P1 that includes the rotational center axis A. The third and fourth arms 53 and 54 are disposed opposite sides with respect to the first reference plane P1 that includes the rotational center axis A. The first reference plane P1 extends parallel to a longitudinal direction of the crank arm 14 in a mounted state where the bicycle sprocket 12 is mounted to the crank arm 14. Moreover, the first and second arms 51 and 52 are disposed on opposite side of the third and fourth arms 53 and 54 with respect to a second reference plane P2 that is perpendicular to the first reference plane P1 and that includes the rotational center axis A.

As seen in FIGS. 5 and 6, the central portion 34 has a first end surface 64 that is disposed around the central opening 40 on at least one of the first and second side surfaces S1 and S2. The first end surface 64 is axially outermost or innermost end surface of the central portion 34. Here, the first end surface 64 is disposed on the first side surface S1 of the sprocket body 30. The central portion 34 is at least partially disposed between the first and second arms 51 and 52. The central portion 34 is at least partially disposed between the third and fourth arms 53 and 54, Here, the first end surface 64 is an annular axially facing surface that defines one of an outer boundary and an inner boundary of the central portion 34. In the first embodiment, the first end surface 64 faces axially from inward side of the sprocket body 30 that corresponds to a frame facing side of the sprocket body 30.

As seen in FIGS. 5, 6 and 10, the sprocket body 30 further includes a rib protruding from the at least one of the first and second side surfaces S1 and S2 of the intermediate portion 38. The other of the at least one of the first and second side surfaces S1 and S2 is configured to face the crank arm 14 that engages with the central opening 40 in a mounted state where the bicycle sprocket 12 is mounted to the crank arm 14. Here, in the first embodiment, the first side surface S1 includes the rib and corresponds to a frame facing side of the sprocket body 30, while the second side surface S2 corresponds to a non-frame facing side of the sprocket body 30. The rib has a second end surface 70 that is axially outermost or innermost surface of the intermediate portion 38. The second end surface 70 is farther away from the center plane CP than the first end surface 64 in the axial direction. At least part of the rib extends in a direction perpendicular to the first reference plane P1 that extends parallel to a longitudinal direction of the crank arm 14 in a mounted state where the bicycle sprocket 12 is mounted to the crank arm 14.

In the first embodiment, the sprocket body 30 further includes a first rib 71 and a second rib 72. Here, the first and second ribs 71 and 72 are symmetrically disposed each other with respect to the rotational center axis A. The second end surface 70 includes a first rib end surface 75 that is provided on the first rib 71 and a second rib end surface 76 provided on the second rib 72. The first and second ribs end surfaces 75 and 76 are farther away from the center plane CP than the first end surface 64 in the axial direction. In other words, an axial height of at least one of the first and second ribs 71 and 72 is larger than an axial height of the central portion 34 with respect to the center plane CP. However, the bicycle sprocket could be provided with one of the first and second ribs 71 and 72, if needed and/or desired for a particular crank assembly. Preferably, as seen in FIG. 2, the first and second ribs 71 and 72 extend in extension directions that are perpendicular to a longitudinal direction the length dimension) of the crank arm 14. In this way, in a mounted state where the bicycle sprocket 12 is mounted to the crank arm 14, the first and second ribs 71 and 72 extend vertically when an angle of the crank arm 14 becomes horizontal where a rider's pedaling force, becomes highest.

The first rib 71 extends along a part of an outer periphery of the first intermediate opening 56. On the other hand, the second rib 72 extends along a part of an outer periphery of the third intermediate opening 60. The first and second rib end surfaces 75 and 76 constitute an axially outermost point of the intermediate portion 38 with respect to the axial direction of the bicycle sprocket 12. Here, the first and second rib end surfaces 75 and 76 are disposed on the first side surface S1 of the sprocket body 30. The first rib 71 at least partially extending in a direction perpendicular to the first reference plane P1. The first rib 71 extends from the first arm 51 to the second arm 52 in a direction perpendicular to the rotational center axis A. At least part of the first rib 71 extends linearly between the first and second arms 51 and 52. The second rib 72 at least partially extending in a direction perpendicular to the first reference plane P1. The second rib 72 extends from the third arm. 53 to the fourth arm. 54 in a direction perpendicular to the rotational center axis A. At least part of the second rib 72 extends linearly between the third and fourth arms 53 and 54.

As seen in FIG. 6, the first rib 71 at least partially extends from the first arm 51 to the second arm 52 such that an angle θ1 between the first rib 71 and the first reference plane P1 including the rotational center axis A is in a range between sixty-five degrees to ninety degrees as viewed in the axial direction. Here, the angle θ1 is ninety degrees. The first reference plane P1 extends parallel to a longitudinal direction of the crank arm 14 in a mounted state where the bicycle sprocket 12 is mounted to the crank arm 14. Specifically, the first reference plane P1 includes the rotational center axis A of the sprocket body 30 and a rotational center axis of a bicycle pedal (not shown). On the other hand, the second rib 72 at least partially extends from the third arm 53 to the fourth arm 54 such that an angle θ2 between the second rib 72 and the first reference plane P1 including the rotational center axis A is in a range between sixty-five degrees to ninety degrees as viewed in the axial direction. Here, the angle θ2 is ninety degrees.

The first rib 71 has a first end portion 71a, a second end portion 71b and a middle portion 71c. The first end portion 71a is disposed on the first arm 51. The second end portion 71b is disposed on the second arm 52. The middle portion 71c is disposed between the first and second end portions 71a and 71b. The middle portion 71c has an axial height H1 that is larger than axial heights H2 and H3 of the first and second end portions 71a and 71b. The axial heights H1, H2 and H3 are measured from the center plane CP to an axial edge of the middle portion 71c and the first and second end portions 71a and 71b, respectively. Here, the axial height H1 of the middle portion 71c is constant. On the other hand, the axial heights H2 and H3 of the first and second end portions 71a and 71b are tapered so that they get gradually smaller as the first and second end portions 71a and 71b extend away from the middle portion 71c. Thus, the transitions between the middle portion 71c and the first and second end portions 71a and 71b occur where the axial height of the first rib 71 starts to be become smaller than the axial height of the middle portion 71c. The middle portion 71c is disposed on the at least one of the first and second side surfaces S1 and S2 of the central portion 34. The first and second end portions 71a and 71b are disposed on opposite sides with respect to the first reference plane P1 including the rotational center axis A. The first and second end portions 71a and 71b extend from the middle portion 71c toward the second reference plane P2 that is perpendicular to the first reference plane P1 and includes the rotational center axis A. In the first embodiment, the first and second end portions 71a and 71b are curved rib portions of the first rib 71, while the middle portion 71c is a planar rib portion of the first rib 71.

The second rib 72 has a first end portion 72a, a second end portion 72b and a middle portion 72c. The first end portion 72a is disposed on the third arm 53. The second end portion 72b is disposed on the fourth arm 54. The middle portion 72c is disposed between the first and second end portions 72a and 72b. In the first embodiment, the first and second end portions 72a and 72b are curved rib portions of the second rib 72, while the middle portion 72c is a planar rib portion of the second rib 72, Thus, the second rib 72 is identical to the first rib 71, except that the second rib 72 is a mirror image of the first rib 71 and extends between the third and fourth arms 53 and 54 instead of between the first and second arms 51 and 52.

Referring now to FIG. 13, a bicycle crank assembly 110 is illustrated that includes a bicycle sprocket 112 in accordance with a second illustrated embodiment. The bicycle crank assembly 110 further includes a crank arm 114 and a crank axle 116. Here, the crank arm 114 is a right crank arm. The crank arm 114 is rigidly fixed to a first (right) end of the crank axle 116 in a conventional manner (e.g., crimping, locking ring, press-fitting, adhesive, fixing bolt, etc.). The crank arm 114 extends radially outward from the crank axle 116. A left crank arm (not shown) is fixed to a second (left) end of the crank axle 116 in a releasable and reinstallable manner (e.g., clamping or other suitable arrangement). The bicycle sprocket 112 is attached to the crank arm 114 by a fixing bolt 118. Alternatively, the bicycle sprocket 112 is attached to the crank arm 114 by a lock ring, or plurality of fixing bolts. While the bicycle crank assembly 110 is illustrated with only a single bicycle sprocket (i.e., the bicycle sprocket 112), it will be apparent to those skilled in the bicycle field from this disclosure that the bicycle crank assembly 110 can have two or more bicycle sprockets.

The crank arm. 114 and the crank axle 116 are identical to the crank arm 14 and the crank axle 16, respectively, which are discussed above. Thus, the crank arm 114 and the crank axle 116 will not be discussed in detail. Basically, the crank arm 114 has a crank axle receiving opening 120 at one end and a threaded pedal axle receiving hole 122 at the other end. The crank axle receiving opening 120 with a plurality of internal splines 120a and an internal thread 120b. The crank axle 116 has a plurality of external splines 116a that engage the internal splines 120a of the crank arm 114 to prevent relative rotation between the crank arm. 114 and the crank axle 116. The fixing bolt 118 has an external thread 118a that is screwed into the internal thread 120b of the crank arm 114 to attach the bicycle sprocket 112 to the crank arm 114. The crank arm 114 also has a plurality of external splines 128 for engaging with the bicycle sprocket 112 to prevent relative rotation between the bicycle sprocket 112 and the crank arm 114.

Referring now to FIGS. 14 to 20, the bicycle sprocket 112 will now be discussed in more detail. In the second embodiment, the bicycle sprocket 112 is a rigid member made of a suitable rigid material such as a rigid metallic material. The bicycle sprocket 112 basically comprises a sprocket body 130 and a plurality of chain-driving teeth 132. Here, the sprocket body 130 and the chain-driving teeth 132 are formed as a one-piece, unitary member that is preferably formed of a suitable metallic material such as a stainless steel, an aluminum alloy, a magnesium alloy, a titanium alloy, etc. Basically, the sprocket body 130 includes a central portion 134, an annular portion 136 and an intermediate portion 138.

As seen in FIG. 14, the chain-driving teeth 132 are identical to the chain-driving teeth 32 of the bicycle sprocket 12. The chain-driving teeth 132 extend radially outward from the annular portion 136 of the sprocket body 130 to engage with the bicycle chain BC. The chain-driving teeth 132 include a plurality of first teeth 132a having the first maximum chain-engaging width W1 and a plurality of second teeth 132b having the second maximum chain-engaging width W2.

As seen in FIGS. 14 to 20, the sprocket body 130 is identical to the sprocket body 30 except that the reinforcement structure of the sprocket body 130 has been modified. Thus, for ease of understanding the similarities and differences between the sprocket bodies 30 and 130, some of the references symbols of the first embodiment will be used in the second embodiment, while the references symbols of certain parts of the second embodiment will be increase by "100" with respect to the similar part of the first embodiment.

As seen in FIGS. 14 to 17, the central portion 134 of the sprocket body 130 has a central opening 140 through which the rotational center axis A passes. Here, the central portion 134 has a plurality of internal splines 142 for engaging the external splines 128 of the crank arm 114 to prevent relative rotation between the bicycle sprocket 112 and the crank arm 114. The annular portion 136 is disposed radially outward from the central portion 134 with respect to the rotational center axis A. The intermediate portion 138 extends between the central portion 134 and the annular portion 136 in a radial direction about the rotational center axis A.

Similar to the first embodiment, the intermediate portion 138 includes a first arm 151, a second arm 152, a third arm 153 and a fourth arm 154. The first and second arms 151 and 152 at least partially define a first intermediate opening 156 therebetween. The first and third arms 151 and 153 at least partially define a second intermediate opening 158 therebetween. The third and fourth arms 153 and 154 at least partially define a third intermediate opening 160 therebetween. The second and fourth arms 152 and 154 at least partially define a fourth intermediate opening 162 therebetween. The first intermediate opening 156 has a maximum circumferential length C1 that is larger than a maximum circumferential length C2 of the second intermediate opening 158. Here, the first and third intermediate openings 156 and 160 are mirror images, and the second and fourth intermediate openings 158 and 162 are mirror images.

As seen in FIGS. 14 and 15, the central portion 134 has a first end surface 164 that is disposed around the central opening 140. The first end surface 164 is axially outermost or innermost end surface on the first side surface S1 of the central portion 134. Here, the first end surface 164 is an annular axially facing surface that defines an inner boundary of the central portion 134. In the second embodiment, the first end surface 164 faces axially inward side of the sprocket body 130 that corresponds to a frame facing side of the sprocket body 130.

As seen in FIGS. 14, 15 and 19, the sprocket body 130 further includes a rib protruding, from the first side surface S1 of the intermediate portion 138. The rib has a second end surface 170 that is axially outermost or innermost surface of the intermediate portion 138. The second end surface 170 is farther away from the center plane CP than the first end surface 164 in the axial direction. At least part of the rib extends in a direction perpendicular to the first reference plane P1 that extends parallel to a longitudinal direction of the crank arm 114 in a mounted state where the bicycle sprocket 112 is mounted to the crank arm 114.

Similar to the first embodiment, in the second embodiment, the rib includes a first rib 171 that extends from the first arm 151 to the second arm 152 in a direction perpendicular to the rotational center axis A. The first rib 171 extends along a part of an outer periphery of the first intermediate opening 156. The first arm 151 includes a first arm opening 151a that is disposed radially inward of the first rib 171 with respect to the rotational center axis A. The second arm 152 includes a second arm opening 152a that is disposed radially inward of the first rib 171 with respect to the rotational center axis A.

Also, similar to the first embodiment, in the second embodiment, the rib includes a second rib 172 that extends from the third arm 153 to the fourth arm 154 in a direction perpendicular to the rotational center axis A. The second rib 172 extends along a part of an outer periphery of the third intermediate opening 160. The third arm 153 includes a third arm opening 153a that is disposed radially inward of the second rib 172 with respect to the rotational center axis A. The fourth arm 154 includes a fourth arm opening 154a that is disposed radially inward of the second rib 172 with respect to the rotational center axis A.

However, unlike the first embodiment, in the second embodiment, the rib includes a third rib 173 that extends along at least part of an outer periphery of the second intermediate opening 158. In the second embodiment, the third rib 173 extends around whole circumference of the second intermediate opening 158. The third rib 173 is connected to the first rib 171. The third rib 173 is also connected to the second rib 172. Also, unlike the first embodiment, in the second embodiment, the rib includes a fourth rib 174 that extends along at least part of an outer periphery of the fourth intermediate opening 162. In the second embodiment, the fourth rib 174 extends around whole circumference of the fourth intermediate opening 162. The fourth rib 174 is connected to the first rib 171. The fourth rib 174 is also connected to the second rib 172. Here, the first and second ribs 171 and 172 are symmetrically disposed each other with respect to the second reference plane P2. Also, here, the third and fourth ribs 173 and 174 are symmetrically disposed each other with respect to the first reference plane P1.

The second end surface 170 includes a first rib end surface 175 that is provided on the first rib 171 and a second rib end surface 176 provided on the second rib 172. The first and second rib end surfaces 175 and 176 are farther away from the center plane CP than the first end surface 164 in the axial direction. In other words, an axial height of at least one of the first and second ribs 171 and 172 is larger than an axial height of the central portion 134 with respect to the center plane CP.

The first rib 171 has a first end portion 171a, a second end portion 171b and a middle portion 171c. The first end portion 171a is disposed on the first arm 151. The second end portion 171b is disposed on the second arm 152. The middle portion 171c is disposed between the first and second end portions 171*a* and 171*b*. The middle portion 171*c* has a maximum axial height H1 that is larger than maximum axial heights H2 and H3 of the first and second end portions 171*a* and 171*b*. The axial heights H1, H2 and H3 are measured from the center plane CP to an axial edge of the middle portion 171*c* and the first and second end portions 171*a* and 171*b*, respectively. Here, the axial height H1 of the middle portion 171*c* is constant. On the other hand, the axial heights H2 and H3 of the first and second end portions 171*a* and 171*b* are tapered so that they get gradually smaller as the first and second end portions 171*a* and 171*b* extend away from the middle portion 171*c*. Thus, the transitions between the middle portion 171*c* and the first and second end portions 171*a* and 171*b* occur where the axial height of the first rib 171 starts to be become smaller than the axial height H1 of the middle portion 171*c*. The first and second end portions 171*a* and 171*b* are disposed on opposite sides with respect to the first reference plane P1. In the second embodiment, the first and second end portions 171*a* and 171*b* are curved rib portions of the first rib 171, while the middle portion 171*c* is a planar rib portion of the first rib 171.

The second rib 172 has a first end portion 172*a*, a second end portion 172*b* and a middle portion 172*c*. The first end portion 172*a* is disposed on the third arm 153. The second end portion 172*b* is disposed on the fourth arm 154. The middle portion 172*c* is disposed between the first and second end portions 172*a* and 172*b*. In the second embodiment, the first and second end portions 172*a* and 172*b* are curved rib portions of the second rib 172, while the middle portion 172*c* is a planar rib portion of the second rib 172. Thus, the second rib 172 is identical to the first rib 171, except that the second rib 172 is a mirror image of the first rib 171 and extends between the third and fourth arms 153 and 154 instead of between the first and second arms 151 and 152.

As seen in FIGS. 14, 15 and 20, the third rib 173 has a radially outer portion 173*a* that extends along a radially outer edge of the second intermediate opening 158. The third rib 173 has a radially inner portion 173*b* that extends along a radially inner edge of the second intermediate opening 158. As seen in FIG. 20, the radially inner portion 173*b* has an axial height H4 that is larger than axial height H5 of the radially outer portion 173*a*.

As seen in FIGS. 14, 15 and 20, the fourth rib 174 is a mirror image of the third rib 173 with respect to the first reference plane P1. The fourth rib 174 has a radially outer portion 174*a* that extends along a radially outer edge of the fourth intermediate opening 162. The fourth rib 174 has a radially inner portion 174*b* that extends along a radially inner edge of the fourth intermediate opening 162. As seen in FIG. 20, the radially outer portion 174*a* has the same axial height as the radially outer portion 173*a*, and the radially inner portion 174*b* has the same axial height as the radially inner portion 173*b*. Thus, the axial height of the radially inner portion 174*b* is larger than the axial height of the radially outer portion 174*a*.

As seen in FIGS. 14 and 15, the rib includes a first extending portion 180 that is disposed radially inward of the first rib 171. Specifically, the first extending portion 180 is disposed radially inward of the first end portion 171*a*. The first extending portion 180 extends along at least part of an outer periphery of the first arm opening 151*a*. Also, the rib includes a second extending portion 182 that is disposed radially inward of the first rib 171. Specifically, the second extending portion 182 is disposed radially inward of the second end portion 171*b*. The second extending portion 182 extends along at least part of an outer periphery of the second arm opening 152*a*. Preferably, the rib further includes a third extending portion 184 that is disposed radially inward of the second rib 172. Specifically, the third extending portion 184 is disposed radially inward of the first end portion 172*a*. The third extending portion 184 extends along at least part of an outer periphery of the third arm opening 153*a*. Also, the rib includes a fourth extending portion 186 that is disposed radially inward of the second rib 172. Specifically, the fourth extending portion 186 is disposed radially inward of the second end portion 172*b*. The fourth extending portion 186 extends along at least part of an outer periphery of the fourth arm opening 154*a*.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle sprocket. Accordingly, these directional terms, as utilized to describe the bicycle sprocket should be interpreted relative to a bicycle in an upright riding position on a horizontal surface and that is equipped with the bicycle sprocket. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a sprocket body having a rotational center axis, a center plane perpendicular to the rotational center axis, a first side surface and a second side surface opposite to the first side surface with respect to an axial direction parallel to the rotational center axis, the sprocket body including
a central portion having a central opening through which the rotational center axis passes, and a first end surface disposed around the central opening on at least one of the first and second side surfaces, the first end surface being an axial end surface of the central portion,
an annular portion disposed radially outward from the central portion with respect to the rotational center axis, and
an intermediate portion extending between the central portion and the annular portion in a radial direction about the rotational center axis; and
a plurality of chain-driving teeth extending radially outward from the annular portion of the sprocket body to engage with a bicycle chain,
the sprocket body further including a rib protruding from the at least one of the first and second side surfaces of the intermediate portion, the rib having a second end surface that is an axial end surface of the intermediate portion, the second end surface being farther away from the center plane than the first end surface in the axial direction, in a state where the bicycle sprocket is mounted to a crank arm, the rib protrudes from the side surface not facing the crank arm.

2. A bicycle sprocket comprising:
a sprocket body having a rotational center axis, a first side surface and a second side surface opposite to the first side surface with respect to an axial direction parallel to the rotational center axis, the sprocket body including
a central portion having a central opening through which the rotational center axis passes,
an annular portion disposed radially outward from the central portion with respect to the rotational center axis, and
an intermediate portion extending between the central portion and the annular portion in a radial direction about the rotational center axis, the intermediate portion including a first arm and a second arm, the central portion being at least partially disposed between the first and second arms; and
a plurality of chain-driving teeth extending radially outward from the annular portion of the sprocket body to engage with a bicycle chain,
the sprocket body further including a rib protruding from at least one of the first and second side surfaces of the intermediate portion, the rib at least partially extending from the first arm to the second arm such that an angle between the rib and a reference plane including the rotational center axis is in a range between sixty-five degrees to ninety degrees as viewed in the axial direction, the reference plane extending parallel to a longitudinal direction of a crank arm in a mounted state where the bicycle sprocket is mounted to the crank arm, in a state where the bicycle sprocket is mounted to a crank arm, the rib protrudes from the side surface not facing the crank arm.

3. The bicycle sprocket according to claim 1, wherein the intermediate portion includes a first arm and a second arm, the central portion being at least partially disposed between the first and second arms.

4. The bicycle sprocket according to claim 3, wherein the rib includes a first rib extending from the first arm to the second arm in a direction perpendicular to the rotational center axis, and
the second end surface includes a first rib end surface provided on the first rib.

5. The bicycle sprocket according to claim 4, wherein the first rib has a first end portion disposed on the first arm, a second end portion disposed on the second arm and a middle portion disposed between the first and second end portions.

6. The bicycle sprocket according to claim 5, wherein the middle portion has an axial height that is larger than axial heights of the first and second end portions.

7. The bicycle sprocket according to claim 5, wherein the middle portion is disposed on the at least one of the first and second side surfaces of the central portion.

8. The bicycle sprocket according to claim 5, wherein the first and second end portions are disposed on opposite sides with respect to a first reference plane including the rotational center axis.

9. The bicycle sprocket according to claim 8, wherein the first and second end portions extend from the middle portion toward a second reference plane that is perpendicular to the first reference plane and includes the rotational center axis.

10. The bicycle sprocket according to claim 5, wherein at least part of the first rib extends linearly between the first and second arms.

11. The bicycle sprocket according to claim 3, wherein the first and second arms at least partially define a first intermediate opening therebetween.

12. The bicycle sprocket according to claim 11, wherein the rib includes a first rib extending along a part of an outer periphery of the first intermediate opening.

13. The bicycle sprocket according to claim 3, wherein the first and second arms are symmetrically arranged with respect to a first reference plane including the rotational center axis.

14. The bicycle sprocket according to claim 13, wherein the first reference plane extends parallel to a longitudinal direction of a crank arm in a mounted state where the bicycle sprocket is mounted to the crank arm.

15. The bicycle sprocket according to claim 13, wherein the rib includes a first rib at least partially extending in a direction perpendicular to the first reference plane.

16. The bicycle sprocket according to claim 3, wherein the intermediate portion includes a third arm and a fourth arm, the central portion being at least partially disposed between the third and fourth arms.

17. The bicycle sprocket according to claim 16, wherein the third and fourth arms are disposed opposite sides with respect to a first reference plane including the rotational center axis, and the first and second arms are disposed on opposite side of the third and fourth arms with respect to a second reference plane that is perpendicular to the first reference plane and that includes the rotational center axis.

18. The bicycle sprocket according to claim 17, wherein the rib includes a second rib extending from the third arm to the fourth arm in a direction perpendicular to the rotational center axis.

19. The bicycle sprocket according to claim 18, wherein the first and second ribs are symmetrically disposed each other with respect to the rotational center axis.

20. The bicycle sprocket according to claim 17, wherein the first and second arms define a first intermediate opening therebetween and the first and third arms define a second intermediate opening therebetween.

21. The bicycle sprocket according to claim 20, wherein the first intermediate opening has a maximum circumferential length that is larger than a maximum circumferential length of the second intermediate opening.

22. The bicycle sprocket according to claim 20, wherein the rib includes a third rib extending along at least part of an outer periphery of the second intermediate opening.

23. The bicycle sprocket according to claim 22, wherein the third rib has a radially outer portion that extends along a radially outer edge of the second intermediate opening.

24. The bicycle sprocket according to claim 23, wherein the third rib has a radially inner portion that extends along a radially inner edge of the second intermediate opening.

25. The bicycle sprocket according to claim 24, wherein the radially inner portion has an axial height that is larger than an axial height of the radially outer portion.

26. The bicycle sprocket according to claim 22, wherein the rib includes a first rib extending from the first arm to the second arm in a direction perpendicular to the rotational center axis, and the third rib is connected to the first rib.

27. The bicycle sprocket according to claim 26, wherein the first arm includes a first arm opening disposed radially inward of the first rib with respect to the rotational center axis.

28. The bicycle sprocket according to claim 27, wherein the rib includes a first extending portion disposed radially inward of the first rib.

29. The bicycle sprocket according to claim 28, wherein the first extending portion extends along at least part of an outer periphery of the first arm opening.

30. The bicycle sprocket according to claim 1, wherein at least part of the rib extends in a direction perpendicular to a first reference plane extending parallel to a longitudinal direction of a crank arm in a mounted state where the bicycle sprocket is mounted to the crank arm.

31. The bicycle sprocket according to claim 1, wherein the other of the at least one of the first and second side surfaces is configured to face the crank arm that engages with the central opening in a mounted state where the bicycle sprocket is mounted to the crank arm.

32. The bicycle sprocket according to claim 1, wherein the plurality of chain-driving teeth includes
at least one first tooth having a first maximum chain-engaging width defined in the axial direction, and
at least one second tooth having a second maximum chain-engaging width defined in the axial direction, the second maximum chain-engaging width being smaller than the first maximum chain-engaging width.

33. The bicycle sprocket according to claim 32, wherein the first maximum chain-engaging width is larger than an inner link space defined between an opposed pair of inner link plates of the bicycle chain in the axial direction and smaller than an outer link space defined between an opposed pair of outer link plates of the bicycle chain in the axial direction, and
the second maximum chain-engaging width is smaller than the inner link space.

\* \* \* \* \*